United States Patent
Anderson et al.

(10) Patent No.: US 10,942,280 B2
(45) Date of Patent: Mar. 9, 2021

(54) GNSS CORRELATOR

(71) Applicant: Imagination Technologies Limited, Kings Langley (GB)

(72) Inventors: Adrian John Anderson, Kings Langley (GB); Peter Bagnall, Kings Langley (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 16/689,454

(22) Filed: Nov. 20, 2019

(65) Prior Publication Data
US 2020/0158879 A1    May 21, 2020

(30) Foreign Application Priority Data

Nov. 20, 2018  (GB) ...................................... 1818877

(51) Int. Cl.
| | |
|---|---|
| *G05D 1/00* | (2006.01) |
| *G01S 19/30* | (2010.01) |
| *G01S 19/24* | (2010.01) |
| *H04B 1/7075* | (2011.01) |
| *H04B 1/709* | (2011.01) |

(52) U.S. Cl.
CPC ............ *G01S 19/30* (2013.01); *G01S 19/243* (2013.01); *H04B 1/709* (2013.01); *H04B 1/70752* (2013.01); *G05D 1/0088* (2013.01)

(58) Field of Classification Search
USPC .......................................................... 375/150
See application file for complete search history.

(56) References Cited

U.S. PATENT DOCUMENTS

| | | | |
|---|---|---|---|
| 6,118,808 A | 9/2000 | Tiemann et al. | |
| 8,630,332 B2 * | 1/2014 | Young ..................... | G01S 19/29 375/150 |
| 2007/0153882 A1 * | 7/2007 | Eerola ..................... | G01S 19/30 375/150 |
| 2008/0138891 A1 * | 6/2008 | Belongia ................ | C12M 29/04 435/296.1 |
| 2009/0189808 A1 * | 7/2009 | Chen ....................... | G01S 19/29 342/357.29 |
| 2013/0016010 A1 | 1/2013 | Nayyar et al. | |
| 2015/0071332 A1 | 3/2015 | Xu et al. | |
| 2016/0170027 A1 * | 6/2016 | Margaria ................ | G01S 19/22 342/357.61 |

* cited by examiner

*Primary Examiner* — Eva Y Puente
(74) *Attorney, Agent, or Firm* — Potomac Law Group, PLLC; Vincent M DeLuca

(57) ABSTRACT

A GNSS correlator comprises a buffer and a processing unit. The buffer is configured to store input data representing sample values of a GNSS signal captured over a pre-defined time window. The processing unit is configured to receive one or more correlation parameters in a control signal, and, in a first pass, read the input data from the buffer and perform a first correlation operation on the input data, and, in a second pass, re-read the same input data from the buffer and perform a second correlation operation on the same input data, wherein the second correlation operation is different to the first correlation operation.

20 Claims, 11 Drawing Sheets

GNSS CORRELATOR

BACKGROUND

Global navigation satellite systems (GNSSs) are systems that provide geo-spatial positioning. GNSS receivers are able to receive GNSS signals which are signals that comprise one or more signals each transmitted by a respective GNSS satellite that traverses an orbital path around the Earth. The GNSS receivers process the GNSS signals and determine the location based upon the timing information in the received GNSS signals. GNSS receivers have application, for example, in navigation/guidance systems, and tracking systems.

For some applications, GNSS receivers may be implemented within portable/mobile electronic devices that are not connected to a fixed power source and instead may rely upon a more limited electrical power source such as a battery. In such applications, the power consumption of the GNSS receiver is a major factor in the operating life of the electronic device. Additionally, GNSS receivers may be used in applications where the accuracy in the determined position of the device is critical. In some applications, such as navigation applications, the accuracy in the determination of the location of the device (longitude, latitude, and elevation) by the GNSS receiver is important to the effectiveness of the application. Therefore, it is desired to improve the sensitivity of a GNSS receiver.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to one aspect there is provided a GNSS correlator comprising: a buffer configured to store input data representing sample values of a GNSS signal captured over a pre-defined time window; and a processing unit configured to receive one or more correlation parameters in a control signal, and, in a first pass, read the input data from the buffer and perform a first correlation operation on the input data, and, in a second pass, re-read the same input data from the buffer and perform a second correlation operation on the same input data, wherein the second correlation operation is different to the first correlation operation.

According to another aspect there is provided a method in a GNSS correlator, the GNSS correlator for performing correlation operations on samples of a GNSS signal, the method comprising: storing, in a buffer, input data representing sample values of the GNSS signal captured over a pre-defined time window; receiving, at a processing unit, one or more correlation parameters in a control signal; in a first pass at the processing unit, reading the input data from the buffer and performing a first correlation operation on the input data in dependence on the correlation parameters; in a second pass at the processing unit, re-reading the same input data from the buffer and performing a second correlation operation on the same input data in dependence on the correlation parameters, wherein the second correlation operation is different to the first correlation operation.

The GNSS correlator may be embodied in hardware on an integrated circuit. There may be provided a method of manufacturing, at an integrated circuit manufacturing system, a GNSS correlator. There may be provided an integrated circuit definition dataset that, when processed in an integrated circuit manufacturing system, configures the system to manufacture a GNSS correlator. There may be provided a non-transitory computer readable storage medium having stored thereon a computer readable description of an integrated circuit that, when processed, causes a layout processing system to generate a circuit layout description used in an integrated circuit manufacturing system to manufacture a GNSS correlator.

There may be provided an integrated circuit manufacturing system comprising: a non-transitory computer readable storage medium having stored thereon a computer readable integrated circuit description that describes the GNSS correlator; a layout processing system configured to process the integrated circuit description so as to generate a circuit layout description of an integrated circuit embodying the GNSS correlator and an integrated circuit generation system configured to manufacture the GNSS correlator according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
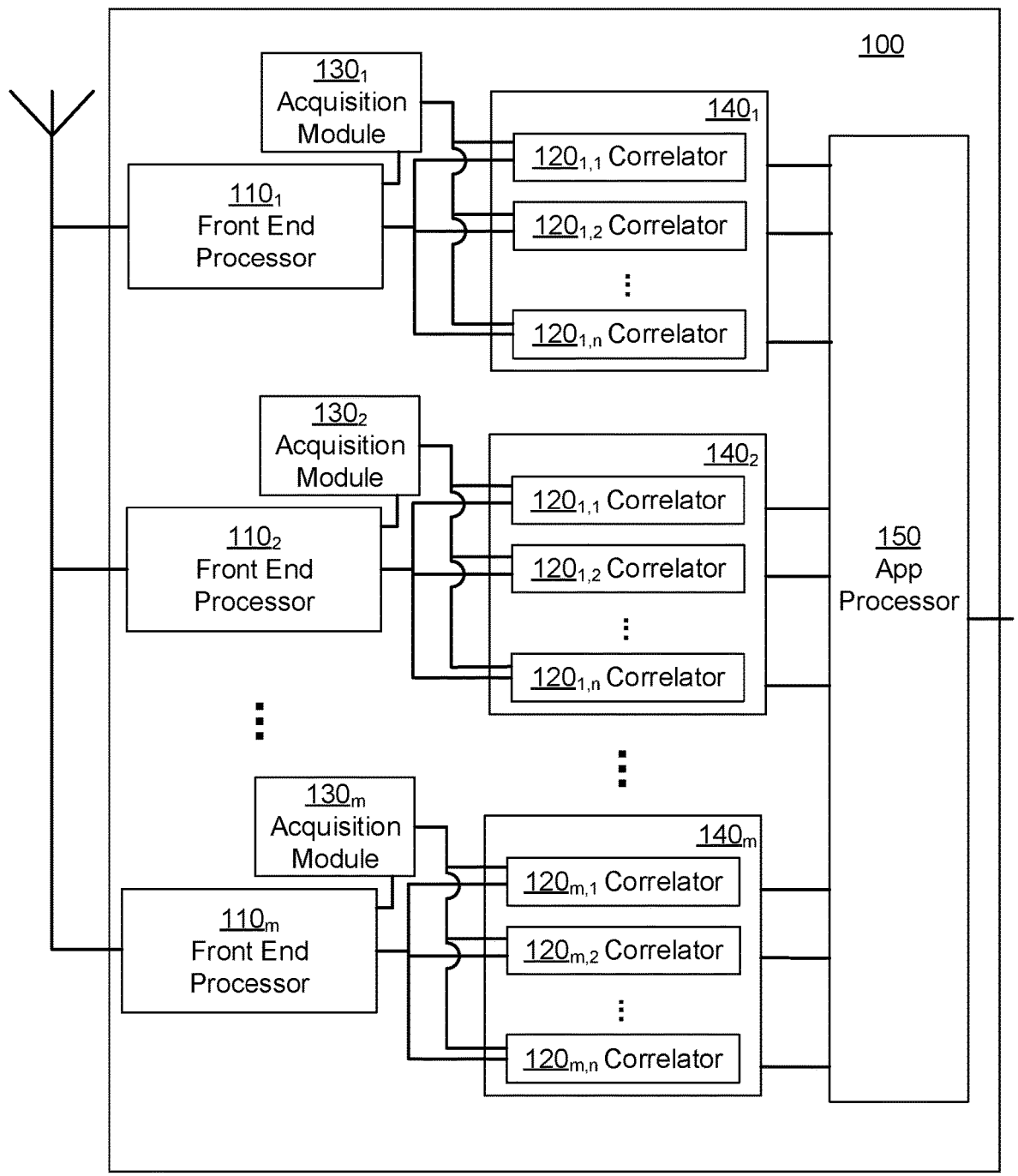
FIG. 1 shows a prior GNSS receiver.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

There are a number of GNSS systems that are operational, or are in development, by different organisations including GPS, GLONASS, Galileo, and BeiDou. These systems share common features. At a high level, each of these systems comprises a constellation that includes a plurality of satellites that each has associated therewith a ranging code which is a pseudo-random code that uniquely identifies the satellite within that system. For example, each GPS satellite has a ranging code that is unique amongst the GPS satellites. The satellites each broadcast a satellite signal that is modulated using the ranging code of the satellite and includes timing information that indicates the timestamp captured by the satellite with respect to its own timing clock indicating the time at which the message is transmitted.

A GNSS receiver is configured to receive a GNSS signal that comprises a number of different satellite signals, each transmitted from a different satellite. Spread spectrum schemes may be used to allow multiple satellite signals to be transmitted at the same time. Some GNSS implementations use code division multiple-access (CDMA) techniques, with the ranging code used as the spreading code. A GNSS receiver is configured to receive the signal and estimate the distance of the receiver from each satellite by comparing the timestamp in the satellite signal received from each satellite that indicates the time at which the signal was transmitted with the time the signal is received derived from a timing clock of the receiver. From this difference in time which relates to the time of flight of each satellite signal, it is possible to estimate the distance of the GNSS receiver from the satellite. Having determined a plurality of estimated distances of the GNSS receiver from different satellites, it is possible to make a determination as to the estimated absolute location of the GNSS receiver.

Not all of the satellites in all of the GNSS systems will be able to transmit to the GNSS receiver at a given instance in time. For example, some satellites may not have a line of sight to the receiver (since they may be in orbit on the other side of the Earth) and thus the GNSS receiver is required to identify which of the satellite signals are within range of the receiver and thus which satellites' signals form the received GNSS signals. To do so, it is typical for the GNSS receiver to have knowledge of each of the possible ranging codes that are used by the satellites in each system.

A correlation operation is performed between the received GNSS signal and known ranging codes to identify in the GNSS signal a particular signal transmitted by a satellite within the GNSS signal. A number of different correlation operations may be performed over a number of different lags (code delays or phase errors) of the satellite signal (and each lag optionally at one or more frequency offsets/Doppler shifts). If, for one of the lags and using one of the ranging codes, a high correlation is identified, there is a high likelihood that the received GNSS signal contains a satellite signal that was transmitted from a satellite associated with that ranging code. It is therefore possible to lock onto the satellite signal and obtain timing information for that satellite by decoding data from the received GNSS signal using receiver parameters for that satellite. The receiver parameters for that satellite (e.g. Doppler frequency and code delay/phase) may therefore be used by the GNSS receiver to synchronise to a particular satellite signal (from a particular satellite) within the GNSS signal. The GNSS receiver uses the receiver parameters to track the satellite and enable the receiver to receive the timing information for that particular satellite signal.

To be able to determine its position, the GNSS receiver identifies from the received GNSS signal satellite signals from a plurality of satellites. The receiver therefore seeks to determine sets of receiver parameters, each enabling synchronisation with available satellite signals. A GNSS receiver typically includes the capability to process received data in a predetermined number of distinct channels, each channel processing a different satellite signal. Since a significant number of correlation operations are required to identify receiver parameters for the respective channels, it is desirable to improve upon the operation of a GNSS receiver in performing the correlation operations.

Prior receivers correlate ranging codes known by the receiver against the GNSS signal to provide a coarse determination as to which satellites are in range of the receiver (referred to herein as acquisition) based on the relative values of the respective correlation operations. This process typically requires the receiver to have performed a correlation between the received GNSS signal and a number of ranging codes at a number of different lags. Once the receiver has identified one or more satellite candidates, each channel is operative to process a respective satellite signal to refine the receiver parameters (e.g. code delay and Doppler frequency) to more accurately lock on to the satellite signal (in a mode herein referred to as a tracking mode) and decode the timing information.

To implement this process a GNSS receiver may be configured to operate in two different modes, namely an acquisition mode or in a tracking mode. In the acquisition mode, the receiver acquires candidate satellites by scanning for present satellites. In the acquisition mode, the GNSS receiver may be configured to effectively scan across all possible lags for a number of ranging codes until it is determined that one or more satellites are present. When it has been determined that one or more satellites are present, a channel of the receiver may be allocated a satellite to track. In the tracking mode, each channel is configured to refine the receiver parameters (code delay and Doppler frequency) for the satellite allocated to that channel. In the event that a lock to a satellite signal is lost during the tracking mode, the GNSS receiver is configured to operate in an acquisition mode to acquire new receiver parameters for that satellite (or a new candidate satellite).

In some receivers, the acquisition mode may be implemented by a separate hardware module that is enabled when acquisition is needed and subsequently disabled when acquisition is completed. The hardware module that implements the acquisition mode may be configured to scan quickly across a number of different possible lags and ranging codes in order to identify a coarse estimation of the receiver parameters. Then subsequent correlation operations used for tracking are performed on a channel-by-channel basis using separate hardware.

The GNSS receiver described herein is configured to include a single correlator module that is able to perform correlation operations for both acquisition and tracking for a plurality of ranging codes using a single hardware module. Since the correlation operation is performed in both acquisition and tracking modes, silicon area in the hardware implementation is reduced by sharing hardware to perform these operations between modes. Moreover, the approach described herein provides flexibility in its implementation.

To do this, the GNSS receiver described herein is configured to store blocks of received samples in the form of data values sampled from a GNSS signal into a memory. The GNSS receiver is configured to subsequently retrieve the samples from memory in batches and to process the retrieved data batch-by-batch in a correlator. By processing the data samples in this way, the data does need to be processed instantaneously—i.e. in real-time. For example, the same window of samples could be processed once for each of a number of different ranging codes and at different lags. In prior arrangements the data was processed effectively in real-time by correlators, such that each pass of the correlator would require new data samples. In this way front end processors need to stay enabled, thereby increasing power consumption. The approach set out in this application enables re-use of the received data samples. By storing the received data to a memory and processing the data 'offline' (i.e. by subsequently retrieving data samples from memory and processing those retrieved data samples), it is possible to disable the front end processors of the GNSS receiver—which typically consumes a significant portion of the power in the receiver.

An example GNSS receiver 100 according to a prior approach is illustrated in FIG. 1. The GNSS receiver 100 comprises m front end processors 110$_1$ to 110$_m$. Each front end processor is configured to receive from an antenna a GNSS signal and to process the GNSS signal according to one of a number of constellations (e.g. GPS, GLONASS etc.). Each front end processor therefore produces a set of digital baseband signals comprising a set of data samples obtained for the associated constellation.

The data samples output from each front end processor are connected to a respective acquisition module 130$_1$ to 130$_m$ and to a respective tracking module 140$_{1,1}$ to 140$_{m,n}$, each tracking module comprising n tracking correlators 120$_{1,1}$ to 120$_{m,n}$ and each connected to an application processor 150. The number of tracking correlators in a tracking module may be the number of channels that are to be processed. In this way, the number of satellites (i.e. ranging codes) that are tracked in parallel during a tracking mode is defined by the number of correlators n in each tracking module.

The front end processors 110$_1$ to 110$_m$ are each communicatively coupled to an antenna which may be external to the module in order to receive a transmitted GNSS signal. The front end processors are configured to process the signals received from the antenna. For example, the front end processors are configured to convert the received GNSS signal into a digital baseband signal comprising data samples of the signal. The conversion may include one or more of noise filtering, down-conversion, quantisation, frequency offset correction, sample rate control decimation. The signal output from each front end processor is therefore a complex digital baseband signal comprising a number of digital samples. The GNSS receiver 100 may have a separate front end processor for each constellation to be processed within the GNSS receiver 100, depending on the number of GNSS system types that are specified for processing. For example, in one implementation the GNSS receiver 100 may include four front end processors each configured to handle one of BeiDou, GLONASS, GPS, and Galileo.

Each front end processor 110$_1$ to 110$_m$ is configured to pass the digital samples that are received to a corresponding acquisition module 130$_1$ to 130$_m$. For each front end processor there is a corresponding acquisition module (though these acquisition modules may be implemented as a single physical acquisition module) and also a corresponding tracking module. There may alternatively be an acquisition module for each channel (i.e. for each satellite ranging code). The acquisition modules are separate modules configured to implement the processing required in the acquisition mode. The acquisition modules are configured to perform a scan across different lags for each ranging code of a plurality of ranging codes (in some cases all ranging codes) and to generate a coarse identification of receiver parameters for candidate satellites.

The acquisition process may involve performing a number of different correlations at the different lags across all of the ranging codes. Since this process can take a long time to perform, the acquisition modules may have a separate correlator for each ranging code that performs a correlation at each of a number of lags. Alternatively, the acquisition module may have a correlator for each combination of lag and ranging code. In this way, the time taken to perform acquisition may be decreased at the cost of silicon area. In operation, the acquisition modules are enabled and acquisition is performed to determine a coarse estimation of receiver parameters for candidate satellites. The coarse receiver parameters generated by acquisition modules for the most likely satellite candidates are passed to corresponding correlators of the associated tracking module 140$_1$ to 140$_n$.

Each tracking module may contain n correlators, where n is the number of channels that are provided by the tracking module. In practice, the number of correlators in each tracking module may be less than the total number of ranging codes that exists within the constellation, e.g. in some applications may be 16 or 32 channels. The tracking modules 140$_1$ to 140$_n$ are configured to implement the processing required in the tracking mode, namely to refine the coarse receiver parameters for the associated satellite so as to lock onto the satellite allocated to that channel and to track the satellite. Once tracked, the data samples from the tracked satellites are passed to an application processor 150. The application processor 150 processes the received data samples for each tracked satellite to determine the distance of each tracked satellite and outputs positioning information based on the signals received for each locked satellite.

On start-up, the GNSS receiver 100 initially operates in an acquisition mode since the GNSS receiver 100 does not have knowledge of the position of any satellites. In this mode, the front end processors pass to the acquisition modules $130_1$ to $130_m$ sample data and the acquisition modules operate to determine coarse receiver parameters for synchronising with the ranging codes of available satellites.

Once the acquisition mode is complete, the acquisition modules are disabled and the GNSS receiver 100 is configured into a tracking mode in which the tracking modules $140_1$ to $140_n$ are enabled and the coarse receiver parameters are used to process different and subsequently received data samples, received from the front end processors.

GNSS Receiver

Figure 2A:
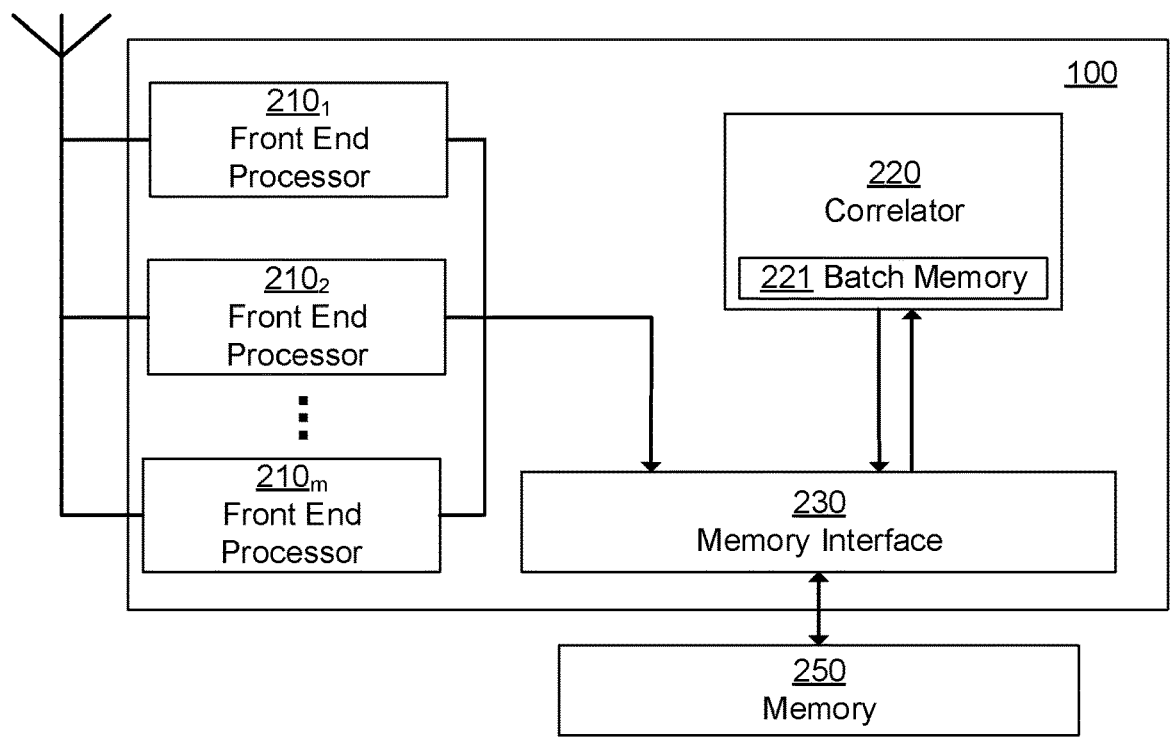
FIG. 2(a) shows an example of a GNSS receiver according to the present disclosure.

FIG. 2(a) illustrates an example GNSS receiver 100 according to the present disclosure. GNSS receiver 100 comprises one or more front end processors $210_1$ to $210_m$, a memory interface 230, a controller (not shown), and a correlator 220. GNSS receiver 100 is connected to an antenna that is configured to receive a GNSS signal. The GNSS signal comprises one or more different satellite signals, each satellite signal transmitted from a different satellite. The satellite signals are typically transmitted using a spread spectrum scheme, such as CDMA, to enable multiple signals to be transmitted over the same wireless channel.

Each satellite may transmit data using one of a number of existing GNSS systems, each system using one of a number of different constellations. The GNSS receiver 100 comprises m front end processors $210_1$ to $210_m$, where m is the number of constellations that the GNSS receiver is configured to process. The front end processors correspond to those previously described with respect to FIG. 1.

The GNSS receiver 100 also comprises a memory interface 230. Each of the front end processors is configured to receive the GNSS signal from the antenna and to process the GNSS signal in order to generate digital baseband sample values of the GNSS signal. The generated baseband sample values output by a front end processor represent a set of sample values for a particular constellation of the plurality of constellations across a predetermined window in time. Each of the sets of the sample values (one set per constellation) are passed from the front end processors to be stored in memory 250 via a memory interface 230. The memory interface 230 is communicatively coupled to the memory 250 and the receiver 100 is configured to store a batch of signals from one or more front end processors into memory.

In the arrangement of FIG. 2, memory 250 may be external to the GNSS receiver and comprised within a computing system (in which the receiver is also located), as will be described in more detail later. As such, memory 250 may be shared amongst a number of different peripheral modules in the computing system, one of which may be the GNSS receiver. In this way, the GNSS receiver 100 may require to access the memory using a memory interface 230 that is able to control or arbitrate access to the memory 250. The memory interface may be a memory controller that enables the memory access directly, so as to memory-memory, peripheral-memory, and memory-peripheral transactions.

The memory interface may be a DMA controller. If memory 250 is internal to the GNSS receiver, it may not be necessary to implement a memory controller (such as a DMA controller). Memory 250 may be a memory resource that is shared between a number of different modules of the GNSS receiver and may also be shared between other peripherals outside of the receiver. Reference herein to "a memory" is reference to a single logical memory resource. In practice the memory may be one or more physical memories that may be presented as a single memory resource available to the GNSS receiver. Memory 250 may be volatile memory such as RAM.

GNSS receiver 100 further comprises a correlator 220 that is configured to receive sample data values generated by a front end processor from memory 250 via memory interface 230 and to perform one or more correlation operations on that data (or a portion of that data) with one or more ranging codes (at defined lags) to generate one or more correlation results. In some examples, the correlator 220 may also frequency shift the data samples input to the correlator 220 to enable combinations of lag and ranging code to be correlated at different Doppler shifts/frequency offsets.

The correlator 220 may also comprise a batch memory 221 configured to temporarily store the sampled data values retrieved from memory for processing at the correlator. In some examples, the batch memory 221 may be configured to operate in a double buffer arrangement as described in more detail below. The correlator 220 may also be configured to receive one or more control signals from the controller (not shown) of the GNSS receiver 100. The one or more control signals may include information indicating a ranging code and information defining how the correlation operations are to be performed by the correlator 100.

The information indicating the ranging code may include the ranging code itself or may include an indication as to which ranging code to use in the next one or more correlation operations. For example, the one or more control signals could indicate a memory address in a code memory in the correlator (or in the receiver 100) from which to retrieve the ranging code. Alternatively, the control signal could include a signal that controls a hardware circuit configured to generate the ranging code 'on-the-fly' in the correlator 220. The received data values are then correlated in the correlator 220 against the ranging code to generate a correlation result. Having generated the correlation result, the correlator 220 is then configured to output values representing the correlation result. The output values are transmitted for storage in a location in memory 250 via memory interface 230 that is different to the location in memory of the data samples generated by the front end processors.

In operation, GNSS receiver 100 is configured to pass sample data stored in memory 250 to the correlator 220 for processing. In some arrangements, sample data for a single constellation is passed to the correlator 220 and processed a portion at a time. The data that is passed to the correlator may be a pre-defined portion of the data captured by the front end processor for that constellation in a particular window in time or it may be the entire predetermined window of data samples. The sample data may therefore be passed to the correlator in 'batches' or 'portions' which are processed in turn. In one example, each front end processor may be configured to generate a window of 200 milliseconds of data samples and to store those samples into memory 250. The data samples may be passed to the correlator 220 in batches, such as in 1 to 100 millisecond batches for processing. The minimum size of a batch of samples may be a symbol period to ensure that an entire symbol is correlated.

Batches

Front end processors 210 are configured to capture data samples over a pre-determined window of time from the GNSS signal. This pre-determined window of time may be determined based on a number of different factors, such as the symbol duration of the GNSS signal for a given constellation. As such, a pre-determined number of data samples may be captured at a time by the front end processors. The data samples captured during a particular pre-determined window of time is herein referred to as a 'set' of data samples for a given constellation. This set of data samples is stored in memory 250, and may be stored together.

The controller may be configured to pass at least a portion of the 'set' of data samples to the correlator for processing at a time. Since the data samples are stored in memory, it is not necessary for the correlator to process the data in real-time—i.e. it is not necessary for the correlator to process the entire set of data before another pre-determined window of time has elapsed (and a new set of data samples is captured). Moreover, since the data is held in memory, the data can be handled in smaller portions, meaning that the correlator can be designed to handle data in smaller batches—thereby reducing the required size and throughput of the correlator, thus saving power consumption and silicon area in its implementation without sacrificing the amount of data that the correlator is able to process.

Figure 2B:
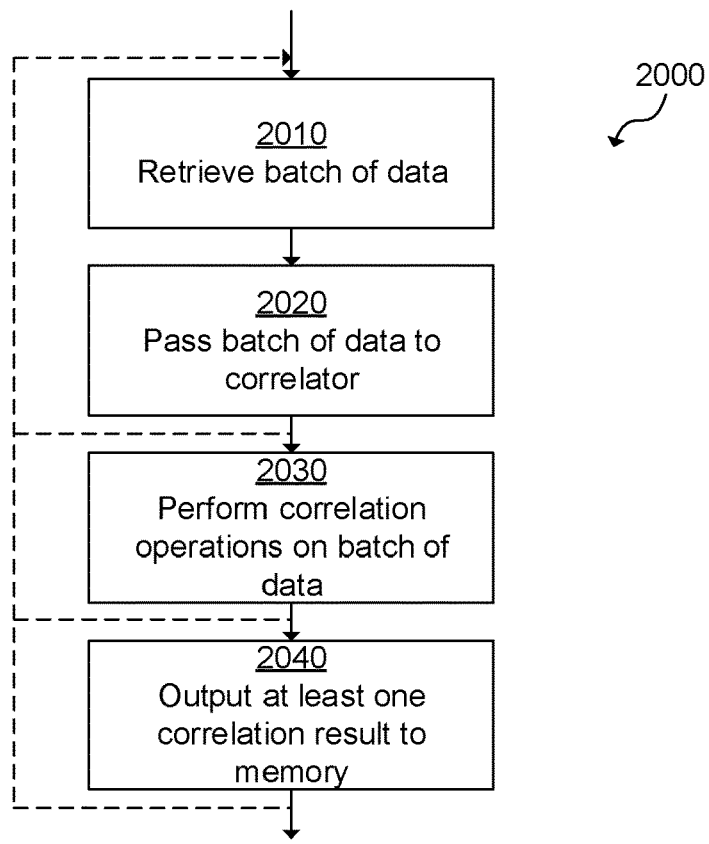
FIG. 2(b) shows a flow chart illustrating an example method of operation of a correlator according to the present disclosure.

FIG. 2(b) illustrates a flowchart that shows an example method 2000 of providing captured sample data stored in memory to a correlator for processing that can be used by receiver 100 in FIG. 2(a). Method 2000 begins at step 2010 at which sample data representing sample values of the GNSS signal received by GNSS receiver 100 has been stored in memory. As described above, the sample data may be stored in sets of sample data, each set having been generated by a respective front end processor.

At step 2010, the method retrieves a first batch of data from memory 250. To do so, the controller (not shown) may control the memory interface 230 to retrieve at least a first portion of samples from a set of data samples. The portion may include a subset of the samples from a set of data samples or may include all of the data samples for an entire set. The data samples in the first batch all belong to a first set. At step 2020, the first batch of data samples is passed to correlator 220 for processing. At step 2030, the correlator 220 is configured to perform one or more correlation operations on the first batch of data to generate one or more correlation results. At step 2040, the one or more correlation results are output from the correlator. The one or more correlation results may be output to memory for processing.

After performing one of step 2020, 2030, or 2040 the method 2000 may optionally be configured to return to step 2010 to retrieve a second batch of data samples. In particular, the correlator 220 may be configured to store more than one batch of data for processing at an instance in time and thus can begin retrieving a next batch of data samples for processing prior to the completion of the processing of the previous batch of data samples. For example, the correlator 220 may include batch memory 221 arranged as a double buffer input, in which the batch memory 221 is divided into two portions—a first portion acting as a first buffer and a second portion acting as a second buffer. The first buffer is configured to buffer a first batch for processing and the second buffer is simultaneously configured to buffer a different, second batch. Then once the data held in the first buffer has been processed or retrieved for processing, the first buffer may be re-filled whilst the data from the second buffer is being processed.

In this way, a second batch of data may be retrieved from memory and passed to the correlator for processing at least partly simultaneously with the first batch. The retrieval and passing of the second batch of data may be subsequent to the retrieval of the first batch but in parallel with the passing of the first batch of data to the correlator.

Figure 2C:
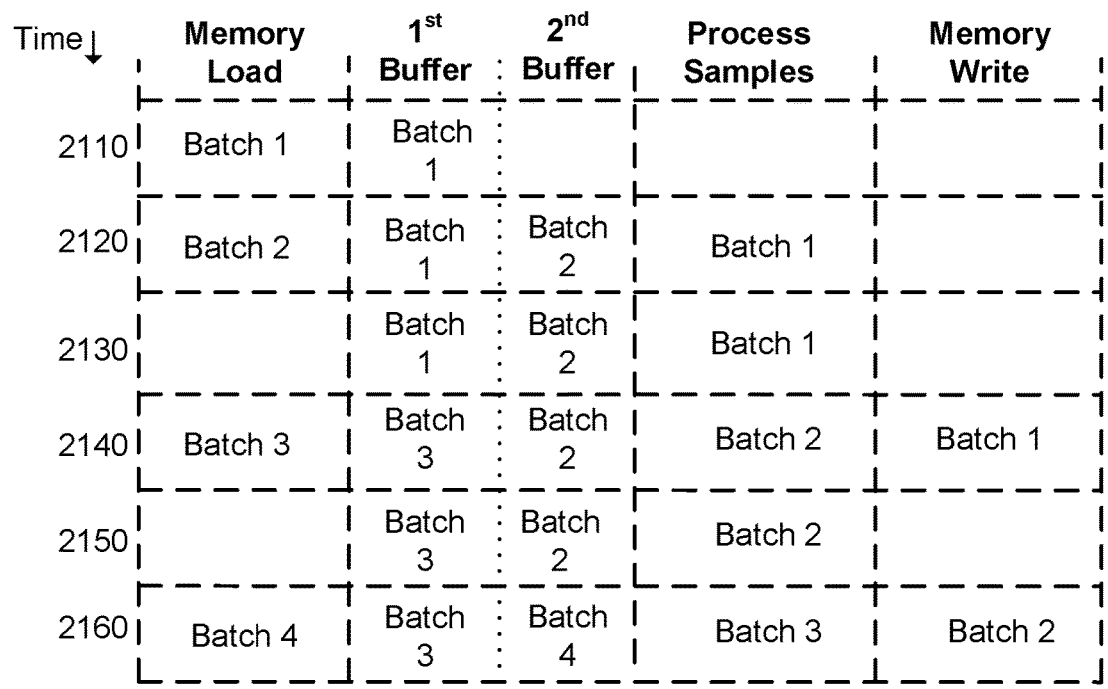
FIG. 2(c) shows a flow diagram illustrating an example of flow of sample data to and from the correlator of FIG. 2(b)

FIG. 2(c) is a flow diagram illustrating the flow of sample data to and from the correlator according to an example of the present disclosure. FIG. 2(c) illustrates five different stages at which the input data samples may occur. A first stage referred to as "memory load" illustrates the retrieval from the memory 250, in accordance with steps 2010 and 2020 of FIG. 2(b). In stages referred to as "$1^{st}$ buffer" and "$2^{nd}$ buffer", the data passed to the correlator is stored respectively in either a first or a second buffer of a double buffered arrangement in accordance with step 2020 of FIG. 2(b). A further stage referred to as "process samples" relates to the performance of a correlation operation by the correlator, in accordance with step 2030, to generate one or correlation results. In a final stage referred to as "memory write", the correlator is configured to write the correlation results back to memory.

In a first step 2110 of FIG. 2(c), sample data from a first batch is retrieved from memory and stored in a first buffer. In a second step 2120, sample data from a second batch is retrieved from memory and stored in a second buffer. Also during the second step 2120, processing of the sample data of the first batch is initiated. During the third step 2130, the processing of the sample data of the first batch continues and, since the first and second buffers are full, no further read of sample data from memory occurs. In a fourth step 2140, the processing of the first batch of sample data is completed and the correlation results for the first batch are written back to memory. Also in the fourth step 2140, the processing of the second batch of data samples is initiated. Since the processing of the first batch of data is completed at the fourth step 2140, it is possible to clear the data samples of the first batch from the first buffer and instead load further data into the first buffer. In the fourth step 2140, sample data of a third batch is retrieved from memory and loaded into the first buffer to replace the first batch stored in the buffer. In a fifth step 2150, the processing of the second batch continues and, since both the first and second buffers are in use (respectively storing the third and second batches of sample data) no further data is loaded from memory. At a sixth step 2160, the processing of the second batch by the correlator is completed and correlation results for the second batch are generated. In the sixth step 2160, the correlation results for the second batch are written back to memory. Also in the sixth step 2160, the correlator is loaded with the samples of the third batch and processing of the third batch is initiated. In the sixth step 2160, since the processing of the second batch is completed, a further batch of data can be loaded into the buffer that previously held the second batch (namely the second buffer). In this way, a fourth batch of data samples is retrieved from memory and stored in the second buffer.

The steps of FIG. 2(c) are repeated until all of the batches of data to be processed by the correlator are completed. In some arrangements, there may be more than one set of data held in memory, each set originating from a different front end processor. Therefore, in some arrangements the batches may be selected from across the sets of data such that a first batch of each set is processed in order before a second batch from a first set is processed. In contrast, it may be that all of the batches for a particular set are processed first before processing the batches from the next set.

In some arrangements, the steps may be implemented in more than one clock cycle. For example, the "process samples" stage of FIG. 2(c) is illustrated as taking two steps but in practice may take many hundreds of clock cycles to complete. For example, a correlator may process the same data held in a buffer multiple times before the processing of that data is complete (for example, using different lags, ranging codes and/or frequency offsets). The arrangement of FIG. 2(c) is therefore intended to illustrate the relative timings of the loads and the partially overlapped processing of different batches of data. In practice, the specific timings of the different steps may depend on the specific application.

The "Memory Load" stage may be initiated in a number of different ways depending upon the specific implementation of the correlator. For example, the correlator (or a controller—not shown) may generate a control signal which indicates that the correlator is ready to receive a new batch of data. This control signal may initiate a new read of a next batch from memory by the memory interface. This control signal may be generated at a number of different stages—for example, where processing of a batch is initiated in the "process samples" stage it may be possible to clear the buffer that held that batch of data and thus a next read may be initiated once processing has begun. Alternatively, it may be necessary to hold the data being processed in the buffer until the processing is completed and thus the control signal to initiate a further read may be generated after processing is completed in the correlator. In some arrangements, it may be necessary to wait for the writing of the correlation results to memory to be completed before a subsequent read is performed. Thus, the control signal may be generated once the memory write is complete. These different circumstances for initiating a further read of a batch of data from memory are illustrated as dashed lines in FIG. 2(b).

Memory Allocation

Figure 3A:
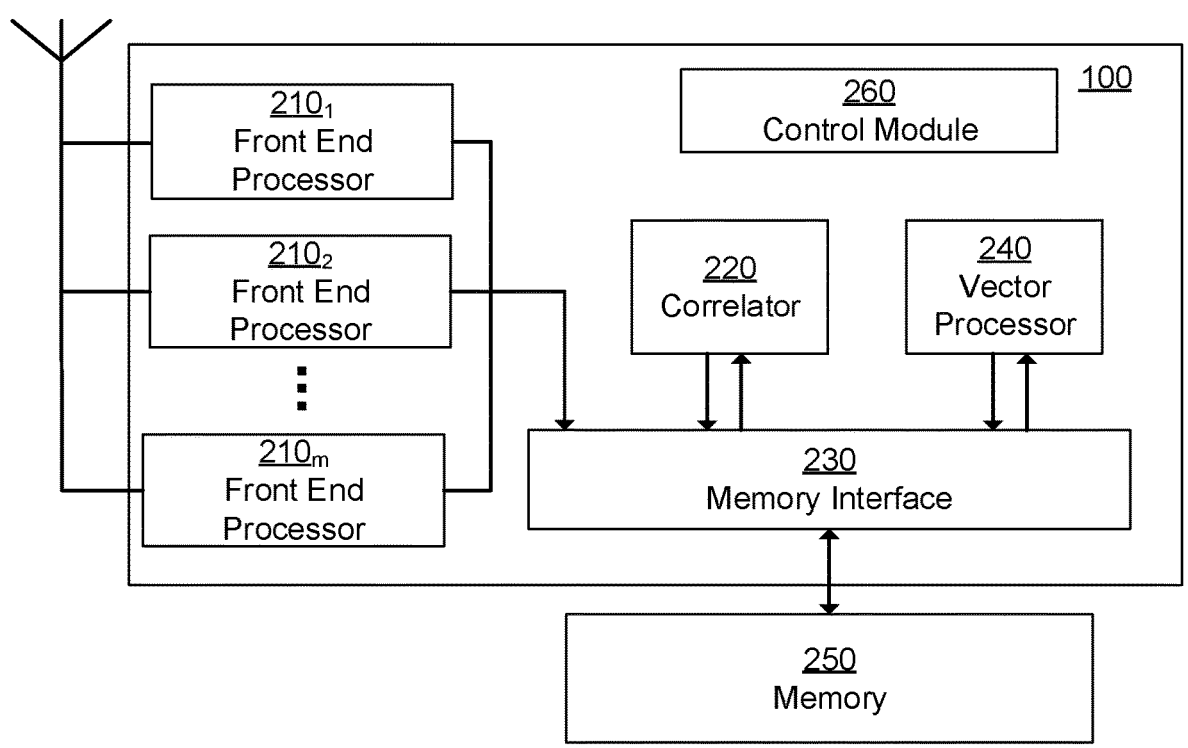
FIG. 3(a) shows a further example of a GNSS receiver according to the present disclosure.

FIG. 3(a) illustrates a GNSS receiver 100 according to an example of the present disclosure. The GNSS receiver 100 of FIG. 3(a) corresponds with the GNSS receiver of FIG. 2(a) except that the GNSS receiver further comprises an additional peripheral module such as a computation unit configured to perform further calculations/computation operations on the correlation results. In the example of FIG. 3(a) the computation unit is a vector processor 240. The example of a vector processor 240 will be described in more detail later. In general, the computation unit may be any peripheral module within the GNSS receiver 100 that is configured to perform additional processing of data as part of the operation of the GNSS receiver. In the example of FIG. 3(a) the vector processor 240 is communicatively coupled to memory 250 via memory interface 230 so as to allow the vector processor 240 to write data to and read data from memory 250. A control module 260 for controlling memory allocation may also be included in the GNSS receiver, as described below.

Since multiple modules in the GNSS receiver are configured to interact with memory 250, it is necessary to share the memory resource amongst the modules. This is achieved by allocating different portions of the shared memory for use by different modules of the GNSS receiver. In other words, from the overall range of memory addresses available at the shared memory for use by the GNSS receiver, separate, distinct and non-overlapping blocks of memory are allocated to each module. The blocks of memory may be defined by memory address ranges in the shared memory. These memory address ranges may be physical or virtual addresses. The blocks may be contiguous, or non-contiguous and scattered in any suitable way over the shared memory space in some examples.

Figure 3B:
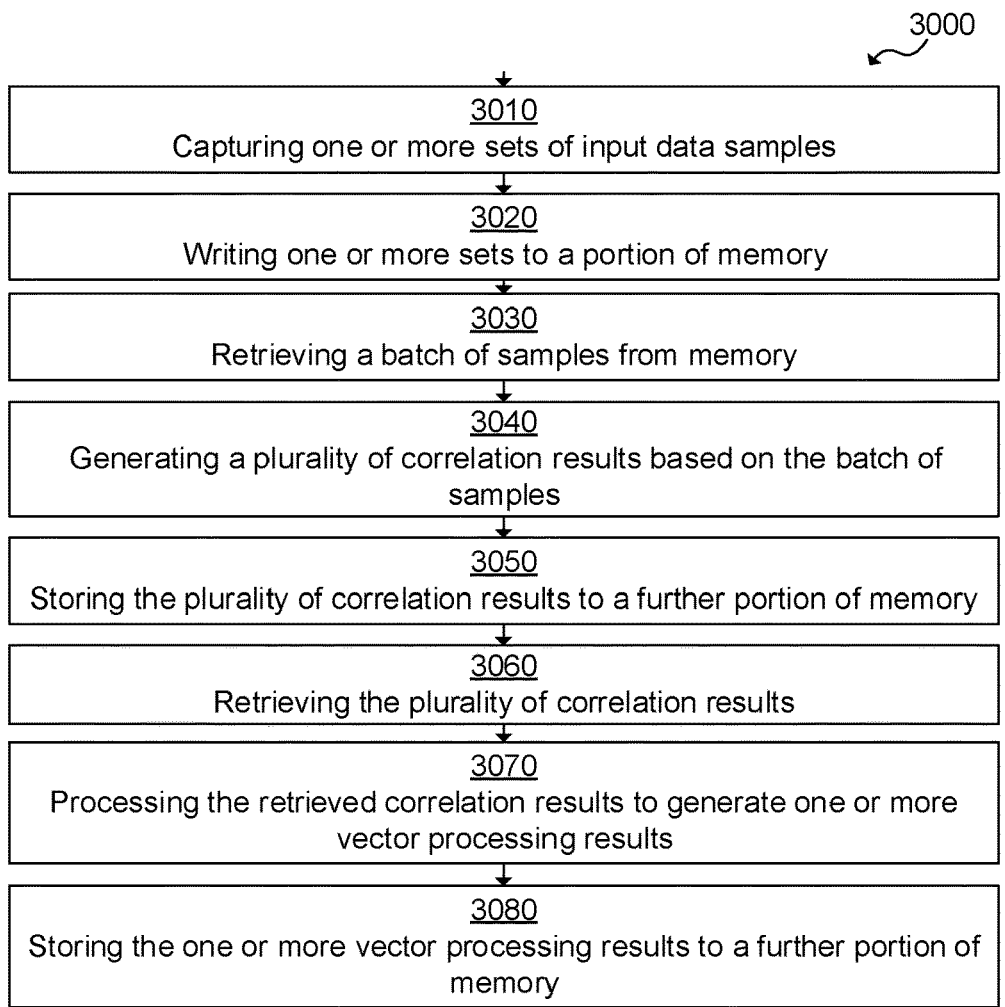
FIG. 3(b) shows an example method for operating a GNSS receiver according to the present disclosure.
Figure 3C:
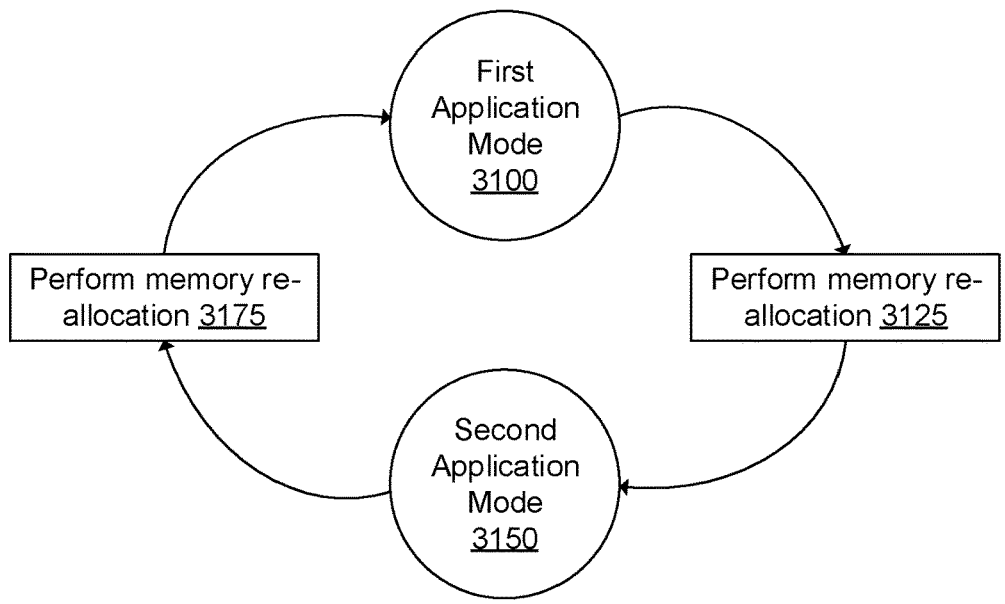
FIG. 3(c) shows an example state transition diagram for a GNSS receiver that shows a process of re-allocating memory resources when transitioning between first and second application modes.

FIG. 3(b) illustrates an example method 3000 for operating the GNSS receiver in which different portions of memory are allocated for use by different elements of the GNSS receiver.

At step 3010 of FIG. 3(b), one or more sets of input data samples are captured by one or more front end processors. The data samples captured by the front end processors are written to memory 250 at step 3020. In some arrangements, the data samples written to memory 250 at step 3020 are written to a first portion of memory. The first portion of memory is a portion of memory 250 that is allocated for use in storing the data samples. This allocation may be performed by the control module 260 which is configured to control the allocation of portions of memory 250. The control module 260 may communicate with each of the peripheral modules of the GNSS receiver (not illustrated in FIG. 3(a) for clarity) to inform them of their memory allocations—i.e. what range of memory addresses are allocated to them.

At step 3030 of FIG. 3(b), at least one batch of data samples from the data samples stored at step 3010 are retrieved from the first portion of memory and passed to a correlator for processing. At step 3040, a plurality of correlation results are generated based on the at least one batch of data samples retrieved at step 3030. At step 3050, the correlation results are stored in memory 250. In some arrangements, the correlation results are written back to a different portion of memory 250 to the first portion. The correlation results may be written back to a second portion of memory that is different to the first portion of memory. This allocation may be performed by the control module which is configured to control the allocation of portions of memory 250, as with the first portion.

At step 3060, one or more correlation results from the correlation results stored in the second portion of memory are retrieved and passed to another module, such as the vector processor 240. The module is configured to process the correlation results at step 3070 to generate further processed results, such as vector processing results (e.g. filtering operations). The further processed results are then stored to a third portion of memory 250. The third portion of memory may be a different portion to both the first and second portions of memory and may also be allocated by the control module. It will be appreciated that additional modules may be used within the GNSS receiver and thus further portions of memory may be allocated to data generated by those modules.

By allocating portions of a shared memory to different modules and controlling the relative allocation of portions of the memory resource to those modules, it is possible to control the resources allocated to each module. In some operating modes, or at particular times during the operation of the GNSS receiver, it is possible to dynamically change the relative allocations of memory to each element of the receiver so as to meet the demands of the elements. For example, there may be times during the operation of the module where the memory required for storing input data samples is larger than others. During these times, it is therefore desirable to increase the size of the first portion of memory to allow more data to be stored.

The GNSS receiver 100 may be configured so that it generates location results in one of a number of different application modes. The demands on different elements of the GNSS receiver differ depending upon the application mode and thus it is desirable to change the allocation of memory between the first to third portions based on the application mode of the GNSS receiver. For example, the size of the window of data that is captured by the front end processors and the size of batches passed to the correlator may depend on the application mode.

In one example, the GNSS receiver may be configured to operate in an application mode referred to as a "push-to-fix" mode of operation. In this application mode, the GNSS receiver 100 may only be required to infrequently generate a determination as to its location—for example, once a day. Such an application mode may be used, for example, in tracking the location of items in shipping or transit applications where regular, near-real-time location information is not required. In this application mode, the GNSS receiver 100 may be configured to capture data samples over a long window of time in the region of 100-200 ms. By storing a large set of data samples to memory in this way, it is possible for the front end processors to be enabled for only a short period of time for the sample data to be captured for each constellation. Once the data samples have been captured, the front end processors may be disabled and the captured data samples may be processed by a correlator.

Since the data samples have been captured to memory 250, the GNSS receiver 100 is able to process the captured data samples without the front end processors being enabled. Put another way, the data samples can be processed "offline" from the receive circuitry of the GNSS receiver 100. This operation reduces the power consumption of the GNSS receiver 100 when operating in the "push-to-fix" application mode. As the GNSS receiver is only required to determine its location infrequently, the operation of the GNSS receiver is less time-critical (when compared with navigation applications, for example) and the precision of the location determination may also be less critical. A large number of data batches can therefore be processed by the correlator over a number of passes without any tight timing constraints imposed by the receiver application. Put another way, it is acceptable to use data that was captured up to a number of seconds ago, since the location information is not deemed to update regularly.

Accordingly, the large window of data (in the order of a plurality of symbol durations) can be processed by the correlator over many batches without the need to keep the receive circuitry enabled. However, such a large window of data requires a relatively large amount memory to store the received data. Accordingly, if the GNSS receiver is configured to operate in a first "push-to-fix" application mode, the control module may be configured to allocate a larger proportion of memory to a first portion of memory than to the second or third portions of memory so that a larger number of data samples can be captured at a time.

In some examples, the GNSS receiver may also (or alternatively) be configured to operate in second application mode which can be considered to be a "navigation" mode. In the second application mode, more regular determinations as to the position of the GNSS receiver 100 are to be performed. Examples of the applications of this application mode are navigation applications, such as road navigation applications for cars. In these applications, the GNSS receiver 100 is required to make regular determinations as to the location of the receiver, such as less than every 500 ms (or more regularly). In addition, the GNSS receiver 100 may be required to make a more accurate determination as to the position of the receiver. For example, in the second mode of operation (e.g. in navigation applications) it may be unacceptable for the GNSS receiver 100 to have an accuracy of greater than 50 m. In contrast, in the first mode of operation an accuracy of greater than 50 m may be acceptable. For example, in object location tracking (for transit applications), it may be acceptable to have a low accuracy determination as to the location of the item—since the item may be regarded as being at one of a number of discrete and disparate locations.

In the second "navigation" application mode, the GNSS receiver 100 may be configured so that front end processors store smaller sets of data than in the first application mode at a given time. For example, in the second application mode only 1 ms of data samples may be stored into memory from each front end processor. In this way, the front end processors may be configurable to provide data samples that are more current in time. In the second application mode, the demands on the first portion of memory 250 are therefore less than in the first application mode and thus it is possible to allocate a smaller amount of memory to the first portion in the second application mode than in the first application mode. But, in the second application mode second and third portions of memory may require a larger proportion of memory since additional processing may be needed in order to obtain a more accurate position determination. It is therefore desirable to allocate a larger proportion of memory 250 to second and third portions in the second application mode than in the first application mode.

FIG. 3(*c*) illustrates a state transition diagram for a GNSS receiver that shows a process of re-allocating memory resources when transitioning between first and second application modes.

In FIG. 3(*c*), the GNSS receiver 100 is configurable to operate in one of two possible application modes 3100 and 3150. In an example, the first application mode is a "push-to-fix" mode and the second application mode is a "navigation" mode. When the GNSS receiver is operating in the first application mode 3100 and is controlled so as to change application mode to the second application mode, the application state of the receiver changes from first application mode 3100 to second application mode 3150. During the transition from first to second application mode, the GNSS receiver is configured to re-allocate 3125 the portions of memory allocated to the various elements of the GNSS receiver for storing data.

For example, a first element may be allocated a first portion and a second element may be allocated a second portion of memory 250. The first element may comprise one or more front end processors and the second element may comprise one or more correlators. During the transition between application modes, the relative sizes of the first and second portions may be re-allocated, i.e. they may be changed. Accordingly, the size of the first and second portions of memory 250 when operating in the second application mode may differ from the size of the first and second portions of memory 250 when the receiver was operating in the first application mode. Similarly, when the application mode of the receiver is changed from the second application mode 3150 to the first application mode 3100, a different memory re-allocation process 3175 is performed.

It will be appreciated that the GNSS receiver may have more than two different application modes. In this way, the GNSS receiver may be configured to transition between more than two different application mode states. In such an arrangement, further possible memory re-allocations may be performed. Each application mode state may have associated therewith a pre-defined set of memory allocations and the receiver may be configured to re-allocate memory 250 according to the pre-defined set of memory allocations for an application state when entering that application state. It will also be appreciated that the GNSS receiver may have any number of elements each having a portion of memory 250 allocated thereto. For example, the receiver may have three or more elements (for example, one or more front end processors, one or more correlators, and one or more vector processors). A portion of memory may be allocated to each element (or for each instantiation of each element) and thus the re-allocation may be performed to allocate any number of portions. In some arrangements, the number of portions to be allocated may also differ between application modes. For example, some elements may not be used in some application modes, and hence no memory allocation may be required for that unused element, enabling the memory to be allocated for other elements. For example, the vector processor may not be required in the "push-to-fix" mode, and can therefore not be allocated any memory, but it may be used in the "navigation" mode, and be allocated a suitable portion of memory.

As well as operating in one or more application modes, a GNSS receiver 100 is also configured to operate in more than one operation mode within a particular application mode. For example, for a particular application mode, the GNSS receiver 100 may (at different times) operate in a first and a second operation mode.

In an example, the GNSS receiver 100 may operate in a first operation mode, referred to as the acquisition mode. In the first operation mode, the GNSS receiver 100 is configured to scan at a fast rate across a range of possible ranging codes to identify candidate satellites. The correlator 220 of the GNSS receiver 100 may operate in an acquisition mode in order to identify possible candidate satellites. In a second operation mode, referred to as the tracking mode, the GNSS receiver 100 is configured to fine tune the receiver parameters for possible candidate satellites.

The amount of memory allocated for the first portion of memory 250 (for example, allocated to front end processors) during the first operation mode may be greater than for the first portion during the second operation mode (tracking mode). Conversely, the second and third portions of memory may require a greater amount of memory during the tracking mode than the acquisition mode. This is because a larger number of data samples may need to be retained in order to perform acquisition and because there are a large number of possible candidate satellites during acquisition whereas more involved processing of correlation results and vector processing results may be required during tracking.

Figure 3D:
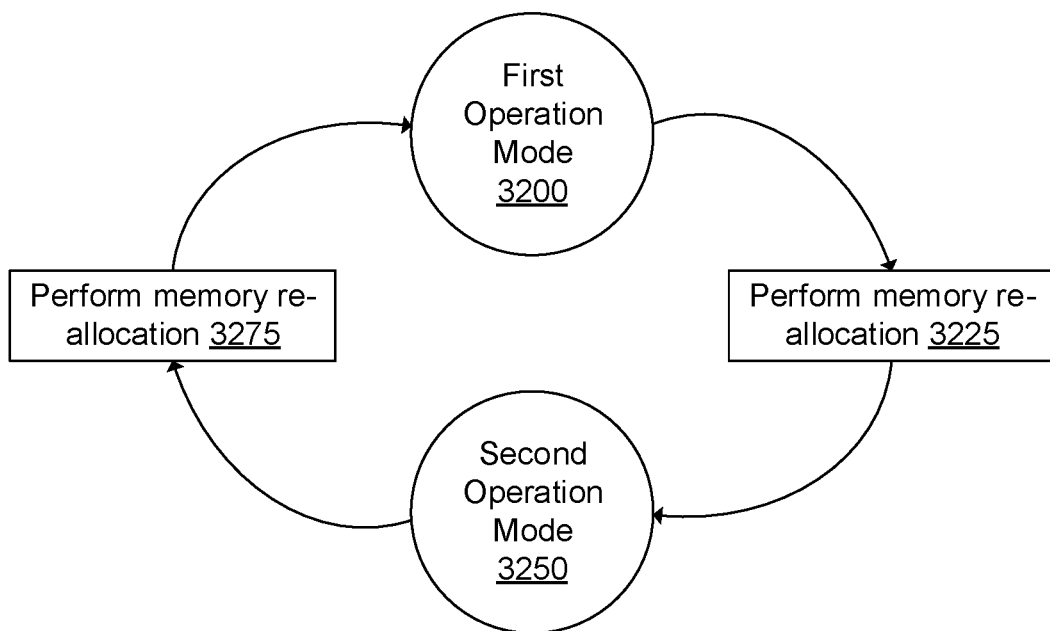
FIG. 3(d) shows an example state transition diagram for a GNSS receiver that shows a process of re-allocating memory resources when transitioning between first and second operation modes within a particular application mode.

FIG. 3(d) illustrates a state transition diagram for a GNSS receiver that shows a process of re-allocating memory resources when transitioning between first and second operation modes within a particular application mode. As illustrated in FIG. 3(d), the GNSS receiver 100 may be configured to operate in a first operation mode in which portions of memory 250 are allocated according to a first allocation. When the GNSS receiver 100 changes mode of operation from a first operation mode to a second operation mode, a re-allocation 3225 of memory 250 is performed so that the receiver 100 interacts with memory 250 according to a second allocation of memory different to the first allocation. When the operation mode of the receiver is changed from the second operation mode 3250 to the first operation mode 3200, memory is re-allocated according to the first allocation. The receiver then interacts with memory in the first operation mode in accordance with the first allocation of portions of memory. As above with respect to FIG. 3(c), any number of portions of memory and operation modes may be used in a receiver.

The number of portions of memory allocated in the different operation modes may be different. For example, some elements of the GNSS receiver may require memory in one mode, but not in another.

For example, the vector processor may not be used in the acquisition mode, and hence not need a memory allocation, but may be used in the tracking mode, and therefore need to be allocated a portion of memory in this operation mode.

Figure 3E:
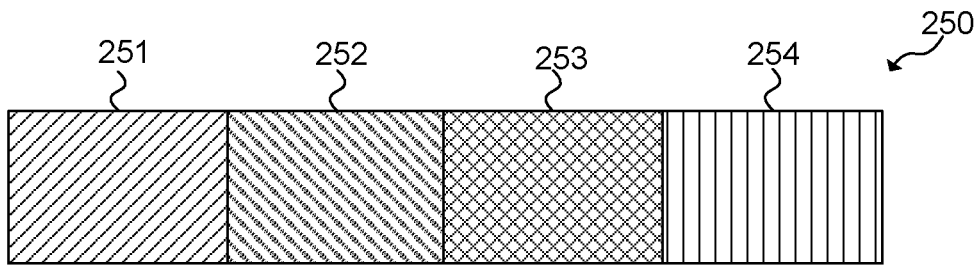
FIGS. 3(e) and 3(f) respectively show example allocations of memory when operating in first and second operation modes.

FIG. 3(e) illustrates an example of the allocation of the memory 250 according to the example GNSS receiver when operating in a first operation mode. In the example of FIG. 3(e), memory 250 may be a single memory resource that is separated into multiple portions, namely into a first portion 251, second portion 252, third portion 253, and fourth portion 254. It will be appreciated that the GNSS receiver 100 has only been allocated a portion of memory 250 for its use. Therefore reference to portions of memory 250 may include reference to portions of the portion of memory 250 allocated to receiver 100.

The first portion 251 of memory 250 may be configured to store data samples retrieved from the front end processor $210_1$, second portion 252 may store data samples from front end processor 2102, and third portion 253 may store data samples from front end processor 2103. Fourth portion 254 of memory 250 may be configured to store the correlation results generated by correlator 220. There may also be a further portion of allocated memory (not shown) that is allocated for storing vector processing results. FIG. 3(e) illustrates the allocation of first to fourth portions when the receiver is operation in a first operation mode (e.g. an acquisition mode).

Figure 3F:
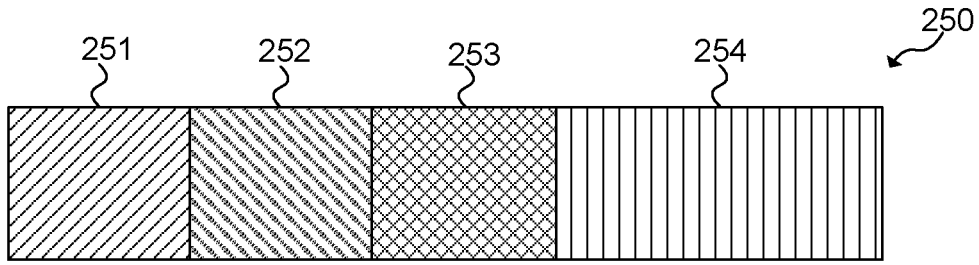

FIG. 3(f) illustrates an example of the allocation of the memory 250 according to the example GNSS receiver when operating in a second operation mode. As can be seen from FIGS. 3(e) and 3(f), in the second operation mode (tracking mode), the size of memory required for the fourth portion 254 of memory 250 allocated for correlation results is greater than in the first operation mode. As such, the GNSS receiver 100 may be configured to perform a re-allocation of the resources of the shared memory when transitioning between the acquisition mode and the tracking mode (or vice versa). The control module in the GNSS receiver may track the modes of operation and control memory allocation accordingly. Since memory 250 is a fixed resource, the proportion of the memory allocation to each of the first to fourth portions may differ between modes.

GNSS Correlator

Figure 4A:
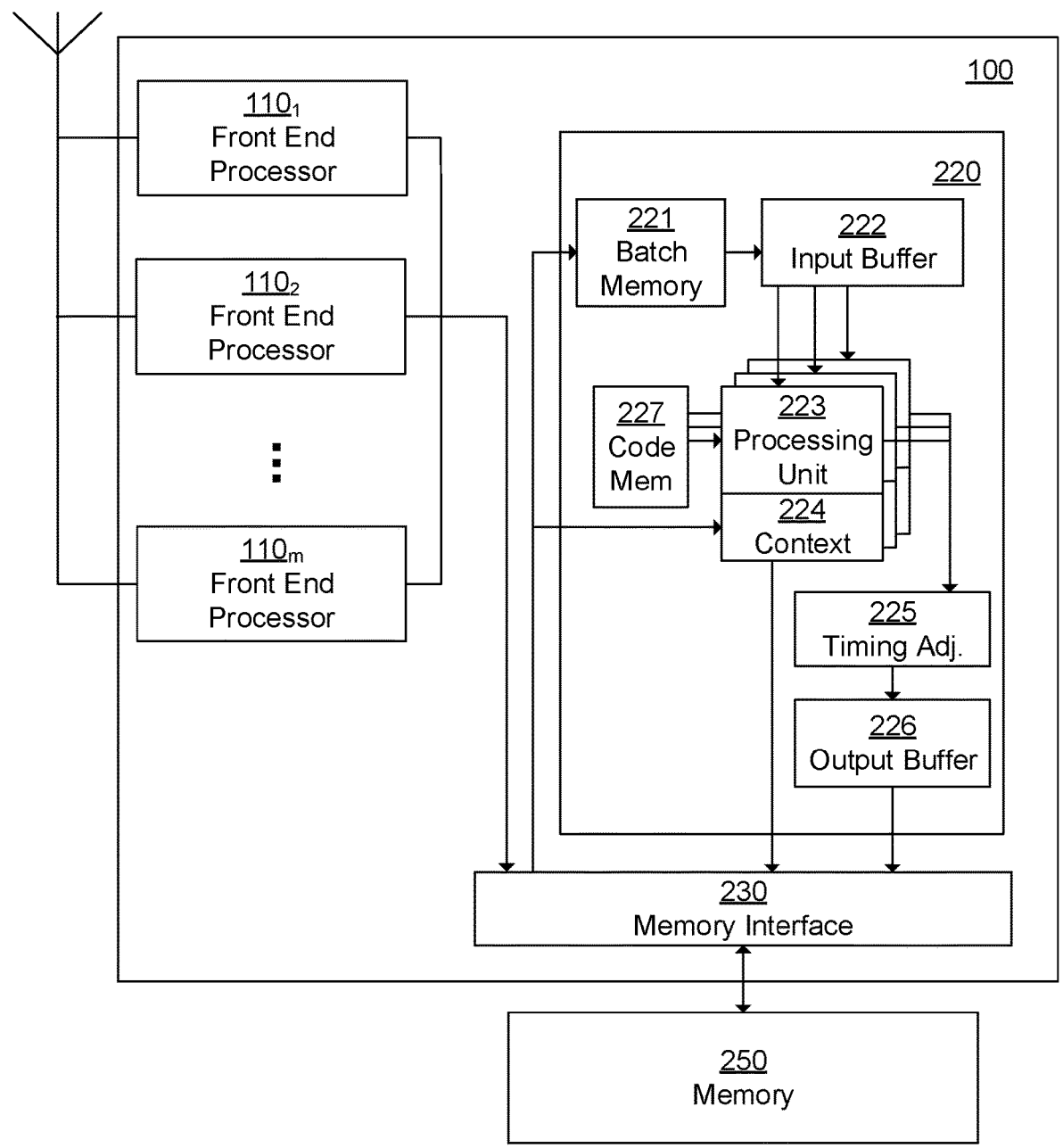
FIG. 4(a) shows a further example of a GNSS receiver according to the present disclosure.

FIG. 4(a) illustrates components of an example correlator 220 according to the present disclosure within receiver 100. Like references correspond to those in FIGS. 2(a) and 3(a). Correlator 220 comprises batch memory 221, one or more input buffers 222, at least one processing unit 223, context storage 224, timing adjustment module 225, and one or more output buffers 226.

Correlator 220 is configured to receive input data samples a batch at a time from memory 250 via memory interface 230 and to perform correlation operations using the data samples to generate correlation results which are stored back to a different portion of memory 250. The correlator 220 is configured to receive one or more control signals (for example from a controller—not shown in FIG. 4(a)) that define the correlation operations to be performed. Based on the received control signals, correlator 220 is configured to retrieve from memory 250 a batch of data samples for a particular constellation that were generated by a front end processor.

The correlator 220 may retrieve from memory 100 to 200 ms of data samples processed by a particular front end processor in some examples. The retrieved batch of data samples is stored in batch memory 221. Batch memory 221 is a local memory internal to the correlator that is configured to hold at least one retrieved batch of data samples (which, in some examples, may operate as a double buffer as outlined above). One or more portions of the retrieved batch of data samples is passed from the batch memory 221 to input buffer 222 at a time. In some examples, 1 ms of sample data from the batch of data held in the batch memory 221 may be passed to the input buffer 222 at a time. Like the batch memory, the input buffer 222 is a local memory internal to the correlator, but is configured to store a smaller amount of sample data than the batch memory.

The correlator is configured to process the data held in input buffer 222 in passes, where each pass involves using each of the one or more processing units of the correlator 220 to perform a set of one or more correlation operations. The input buffer 222 holds data samples that are to be operated upon during a pass of the one or more processing units, and that same data may be used several times in multiple passes, to generate multiple sets of correlation results. In some arrangements, the correlator 220 may not require batch memory 221 to hold the batch of data. Instead, in other arrangements the data retrieved from memory 250 may be sized so as to be held directly in the input buffer 222. Accordingly, the correlator may pass an entire batch of data to input buffer 222 (which may pass through the batch memory 221—if present—unprocessed to the input buffer 222). However, if larger batches are retrieved and stored in the batch memory 221, then a smaller number of memory transactions are required.

The sample data held in the input buffer 222 is passed to one or more processing units 223 which are configured to perform a correlation operation between the data held in the input buffer 222 and a ranging code selected from a range of possible ranging codes. The correlator may be configured to select a ranging code from the possible ranging codes. Each processing unit(s) 223 is configured to receive a ranging code. The processing unit(s) may receive the ranging code from code memory 227.

The code memory 227 may be a fixed, non-volatile memory (such as a ROM) that is pre-programmed with all possible ranging codes across all possible GNSS systems (for example, across all constellations) that the GNSS receiver is configured to receive and process. In other arrangements, in place of the code memory 227, a hardware circuit may be implemented in the correlator (or external to the correlator but as a part of the receiver) that is used to generate the ranging code. In practice, some GNSS systems enable the pseudo-random ranging code to be generated procedurally—thus making the hardware circuit for generating the ranging code relatively simple to implement. However, some GNSS systems rely upon ranging codes that cannot be generated by a hardware circuit simply.

Depending on the application of the receiver, a memory configured to store the pre-determined ranging code values may be used. In either implementation, the GNSS receiver should have knowledge of the possible ranging codes and the capability to provide to the GNSS correlator either (i) the ranging code to be used or (ii) a value enabling the GNSS correlator to generate the ranging code to be used. The ranging code to be used in the correlation operation for a particular correlation operation is selected from the range of possible ranging codes at a particular instance in time. This selection of the ranging code may be done by a separate controller (not shown). The value enabling the generation of the ranging code may be an input to the hardware circuit. Further, each processing unit may be provided with a different ranging code at a given instance in time.

The correlator 220 of FIG. 4(a) may comprise more than one instance of a processing unit 223. Each instance of the processing unit 223 may be implemented so that the processing units 223 perform correlation operations in parallel. Further, each processing unit may, itself, be configured to perform a number of parallel accumulations. In some arrangements, each processing unit 223 may include a number of accumulators, each enabling a correlation operation. In some examples, each processing unit 223 may include 16 accumulators which enables 16 parallel correlation operations that generate 16 separate correlation results in parallel.

The separate correlation results may be generated for a single ranging code, with each accumulation result relating to a different lag/delay across the data held in the input buffer 222 using that single ranging code. Each instance of the processing unit 223 will, in parallel, enable correlation operations based on the same data held in the input buffer 222, and thus may operate on the same constellation data processed by a particular front end processor (though the ranging codes applied may be to different ranging codes for the same constellation). Accordingly, in some arrangements the processing units may, during any particular cycle of processing, be operating on data for a particular constellation. However, in other arrangements multiple input data buffers could be used to allow data from any constellation to be processed in any given processing cycle.

Therefore, based on the arrangement of FIG. 4(a), each processing unit may be configured to perform one or more correlation operations at a number of different lag positions for a particular ranging code in one or more passes of the data held in the input buffer. Additionally or alternatively, the correlator 220 can be configured to perform correlation operations of the input data in different orders—i.e. different combinations of ranging codes and lags may be processed at a given instance in time across the one or more processing units. For example, the correlator 220 may be configured so that each accumulator of each processing unit 223 is configured to perform a correlation operation at a same lag but each with a different ranging code.

In one example, each processing unit 223 may include sixteen accumulators enabling sixteen parallel correlation results to be generated for the data stored in the input buffer 222, and each processing unit may be configurable to perform correlations for sixteen different lags on a single ranging code, or eight different lags on two ranging codes.

Each processing unit 223 may have an associated context unit 224, which is used to store information indicating the state or configuration for the correlation operation currently being performed. For example, this may identify the ranging code, lag, frequency offset applied to the input data, and/or the constellation for a given correlation operation. The context data may be input to the correlator from the memory when reading the data samples, and the context data may also be written out to memory along with the correlation results, so that the results may be associated with a particular configuration/state in later processing. The context data may be encoded as a set of flags or register values.

The correlation results generated by the processing units 223 are passed to a timing adjustment module 225 that re-times the correlation results and passes the re-timed correlation results to the output buffer 226. The output buffer 226 buffers the correlation results into batches of correlations results that are stored to memory 250. This allows the correlation results to be written to memory 250 more efficiently in bursts.

Figure 4B:
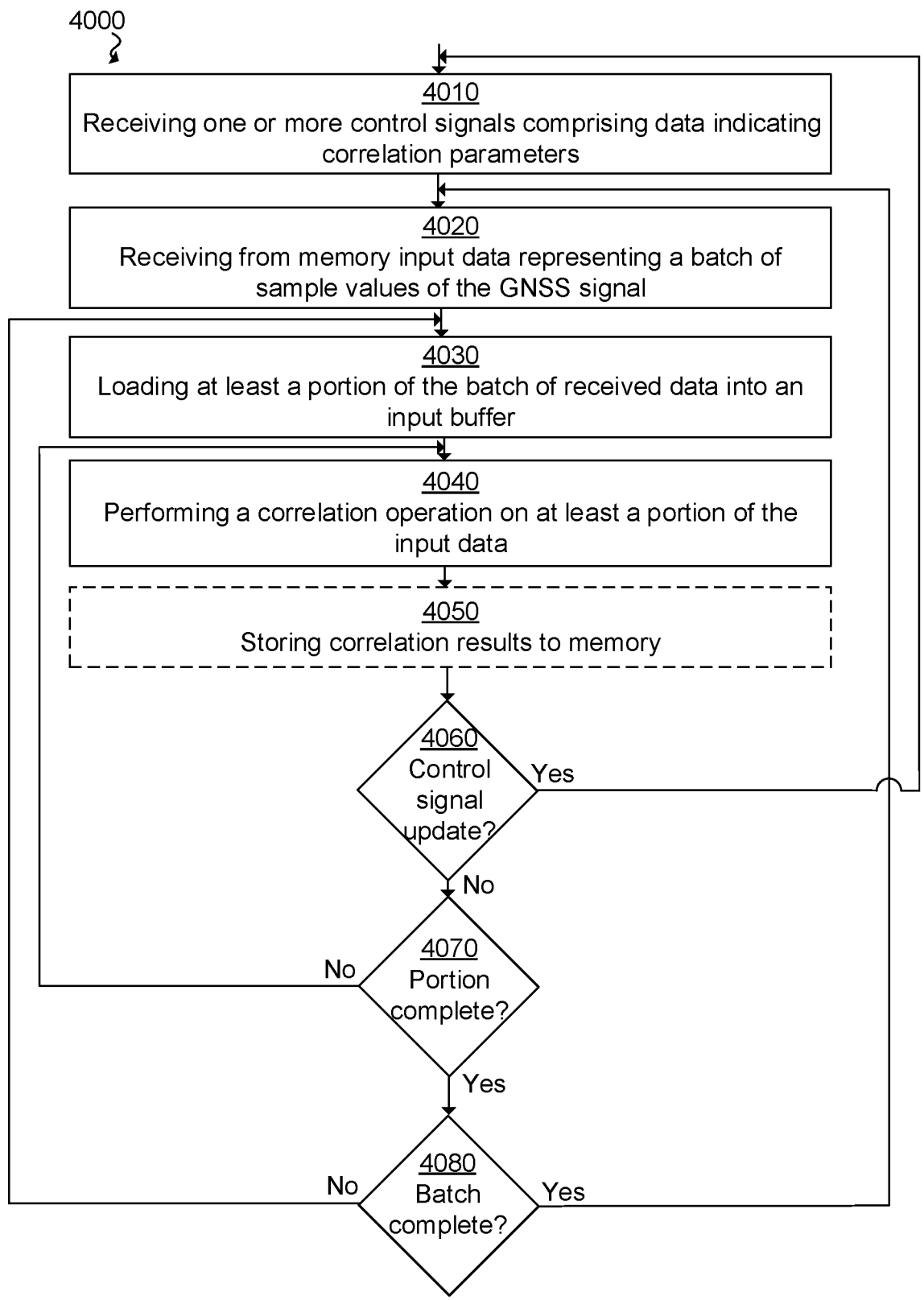
FIG. 4(b) shows a flow chart illustrating an example method for operating a correlator according to the present disclosure.

FIG. 4(b) illustrates an example method 4000 for processing data in a correlator according to the present disclosure, in which sample data of a GNSS signal is retrieved from memory in batches and processed by the correlator in batches or portions of batches over multiple passes.

At step 4010 of FIG. 4(b), one or more control signals are received. The control signals comprise data indicating correlation parameters that define the manner in which the correlation operations should be performed. For example, the correlation parameters may define the lags and ranging codes against which the correlation operations are to be performed. The correlation parameters may also define an order in which correlation operations are to be performed. For example, the one or more control signals may define information required to perform a predetermined number of operations after which further control signals may be required. The control signals may also define the data samples that are to be correlated, for example by defining portions of a batch of data samples to be processed and the parameters used in the correlation operations. At least a portion of the control signals may be received and stored in the context unit 224. Once complete, the method proceeds to step 4020.

At step 4020 of FIG. 4(b), a batch of input data samples are read from memory 250 and stored in the batch memory 221 of the correlator 220. The batch of input data samples to be correlated may be determined based on the received one or more control signals. The data samples may be held in the batch memory 221 for a number of processor cycles so that the correlator is able to perform multiple correlation operations on the same data. Once complete, the method proceeds to step 4030.

At step 4030 of FIG. 4(b) at least a portion of the batch of data samples held in batch memory 221 may be passed to an input buffer 222. The input buffer 222 may be used where the number of data samples to be processed in a given pass by the correlator is less than the size of the batch memory. In this way, it is possible to extract a portion of a batch from the batch memory 221 and to process it from the input buffer 222.

The input buffer 222 is able to hold the portion of the batch of data samples and the data may be read from the input buffer multiple times. In some examples, there may not be a separate batch memory 221 and input buffer 222. Instead, there may just be a single memory/buffer that receives the batch of input data samples and provides this to the processing units. In other words, the functionality of the batch memory and the input buffer may be merged into a single storage unit. Once complete, the method proceeds to step 4040.

At step 4040 of FIG. 4(b), the data samples held in the input buffer 222 (or batch memory 221) are loaded into each of one or more processing units 223. Where there are multiple processing units 223, the same data sample values are provided to each processing unit 223 for processing during a first pass of the data held in the input buffer 222. Each processing unit 223 may be provided with a different set of correlation parameters. For example, each processing unit may process the same data with the same ranging code, each at a different lag (or lags where the processing units can each perform multiple correlation operations). Alternatively, each processing unit may process the same data and with the same lag, each using a different ranging code. Before performing the correlation operation, each processing unit is provided with the ranging code and lag value to be used. Each processing unit may receive a ranging code from ranging code memory 227. Once the ranging code(s), lag value(s), and input data samples are loaded into each processing unit, correlation operations are performed to generate correlation results. Once complete, the method proceeds to step 4050.

At step 4050 of FIG. 4(b), the correlation results are written to memory 250. It will be appreciated that it is not necessary for the correlation results to be written to memory each time the method reaches step 4050. For example, the correlation results may be batched by storing the correlation results to output buffer 226. In this way, step 4050 may only be performed once the method reaches this step and if a criterion regarding the output buffer is met. For example, if the output buffer reaches a predetermined level of fullness (such as completely full) then step 4050 may be performed. If it is deemed that step 4050 does not need to be performed when the method reaches step 4050, then the step may be skipped. Once complete, the method proceeds to step 4060.

At step 4060 of FIG. 4(b), it is determined whether or not new control information is to be received. This may occur where the previously received data indicating correlation parameters is no longer current or where the demands of the GNSS receiver 100 have changed and different correlation operations are required. If new control information is to be received, the method proceeds to step 4010 at which one or more control signals are received and the method proceeds on the basis of the newly indicated correlation parameters. If no new control signals are to be received, the method proceeds to step 4070.

At step 4070 of FIG. 4(b) it is determined if the processing of the portion of the batch of data samples has been completed. For example, it is determined if the all of the correlation operations to be performed on the data held in the input buffer 222 have been completed. If the portion is not completed, the method proceeds to step 4040 at which a further correlation operation is performed on the at least a portion of the input data. This can be considered a second (or further) pass on the data held in the input buffer 222. If the processing of the portion of input data samples is completed, the method proceeds to step 4080 at which it is determined if the processing of the batch of data samples held in the batch memory 221 is completed.

At step 4080 of FIG. 4(b) it is determined if the processing of the batch of data samples held in the batch memory 221 is completed. If not, then the method proceeds to step 4030 at which a further portion of the batch of data samples is loaded for processing and the method proceeds accordingly to process that next portion at step 4040. For example, the next portion to be processed may be loaded into the input buffer 222 for processing and at step 4040 one or more correlation operations may be performed on that next portion. If the processing of a current batch is completed, then the method proceeds to step 4020 at which a further batch of input data samples is loaded from memory 250 and the method repeats for the next loaded batch.

In some implementations, the correlator 220 may not have sufficient bandwidth to perform all of the correlation operations across all of the lags for all ranging codes of a portion of a batch of data held in the input buffer 222 during a single pass of the correlator. For example, in some arrangements there may be 1024 different lags (relating to the chip length of the ranging code) for which a correlation result is to be determined. In an example where each processing unit has 16 different accumulators, it would require 1024/16=64 processing units within the correlator 220 in order to be able to process all possible lags for a given ranging code in a single pass of the correlator. The correlator 220 may need to be implemented in a receiver that has a silicon area budget that does not allow such a number of instances of processing units to be implemented. Accordingly, it may be that a plurality of passes through the processing units needs to be made in order to fully process the input data values with a particular ranging code in a constellation.

Since the correlation operations need to be repeated for many ranging codes and the correlator 220 may process the input data samples in portions (i.e. in multiple passes), it is therefore possible to configure the correlator to perform the correlation operations in different ways based on the specific application of the GNSS receiver 100.

For example, for a particular batch of data held in the input buffer 222, each processing unit 223 may be provided with a different ranging code and may, over the course of a number of different passes of the processing unit, process different lags of the different ranging codes.

For example, a first processing unit may be configured to process lags 0 to 15 for a first ranging code during a first pass. During subsequent passes, the first processing unit may process the next 16 lags for the first ranging code. A second processing unit may process the same lags in the same process but for a different ranging code, such as a second ranging code. Then, each processing unit may have processed all of the lags for a given ranging code and subsequently begin processing the next unprocessed ranging code in the same manner (starting with lags 0 to 15). In this way, it is possible to prioritise particular ranging codes for processing. This operation of the correlator may be useful where a set of particular satellites may be expected (e.g. they were recently seen by the receiver) and the receiver seeks to re-acquire these satellites.

In another example, the correlator 220 may be configured to focus on completing the processing of a single ranging code first. For example, where correlation results for a given satellite are required (for example where lock to a single satellite has been lost). To process a particular ranging code first, each processing unit 223 may be configured to process different lags for the same ranging code. For example, a first processing unit 223 may perform correlations for lags 0 to 15 and a second processing unit 223 may perform correlations for lags 16 to 31 for a first ranging code during a first pass. During a subsequent pass, the first and second processing units 223 may perform correlations for the next lags for the first ranging code until correlation operations for all of the lags for that ranging code have been performed. This allows the processing of a single ranging code.

As will be appreciated, the correlator architecture set out herein allows flexibility over the order in which correlation results for different lags and ranging codes are generated by the correlator 220. For example, the correlator 220 may be configured to prioritise the generation of ranging codes for a subset of the possible ranging codes. The correlator can also prioritise a single ranging code and process all possible lags for that ranging code. Similarly, the correlator can be configured to prioritise a specified range of lags across many different ranging codes. In practice, it is typically more efficient (from a memory efficiency standpoint) to process data samples from a particular constellation at a time. This is because it would be necessary to replace the data samples held in the input buffer 222 at more regular intervals. If there were a change in the data samples used and each time a fresh memory read would be required. Furthermore, the context information context in the context storage 224 would also need to be updated more frequently. Doing this would require data to be read from memory 250 more frequently and thus would place an additional load on memory 250.

Instead, in some arrangements correlation operations of all lags of a particular window of input data against all possible ranging codes for a given batch of input data held in the input data buffer are performed before loading the next batch. By reducing the number of times that the data in the input buffer is re-loaded, the number of memory transactions to memory 250 is reduced, as are the delays in waiting for the data to be loaded into the input data buffer 210. Similarly, in some arrangements it may be more efficient to process all of the batches of data for a particular constellation before moving on to the next constellation to reduce the amount of context data needing to be loaded into the context storage 224. Accordingly, memory bandwidth and data throughput is improved by processing the same data for as long as possible.

Clock Rate Modification

In the acquisition mode of operation described previously, a GNSS receiver seeks to quickly scan over a number of ranging codes to provide a coarse identification of candidate satellites. In many applications, the processing required in the acquisition mode can be significant and can be a significant factor in the time taken for the receiver to lock onto a satellite.

In the presently described GNSS receiver, correlator 220 may be configured to scan all lags and all ranging codes in an efficient and balanced manner until all of the correlation results have been generated and coarse candidate satellites can be identified. Described below is a method for decreasing the time that the GNSS receiver 100 is operating in a particular operation mode (e.g. the acquisition mode) by adjusting the processor clock rate used by the correlator. Since, in the GNSS receivers described herein, the GNSS input data samples are stored first to memory, they can effectively be processed 'off-line' which allows the correlator to perform correlation operations at rate determined by the speed of the processor clock rather than the rate at which data is received. Correlation operations can therefore be performed using a faster clock speed in some circumstances in order to reduce the delay in locking to satellites. Then, once the GNSS receiver 100 is operating in a different mode of operation (such as the aforementioned tracking mode), the clock speed of the correlator 220 may be adjusted to a different rate, since the rate at which correlation operations need to be performed may be less—i.e. the burden on the correlator may be less in a different mode of operation and thus the throughput of the correlator may be less time-critical.

Figure 5:
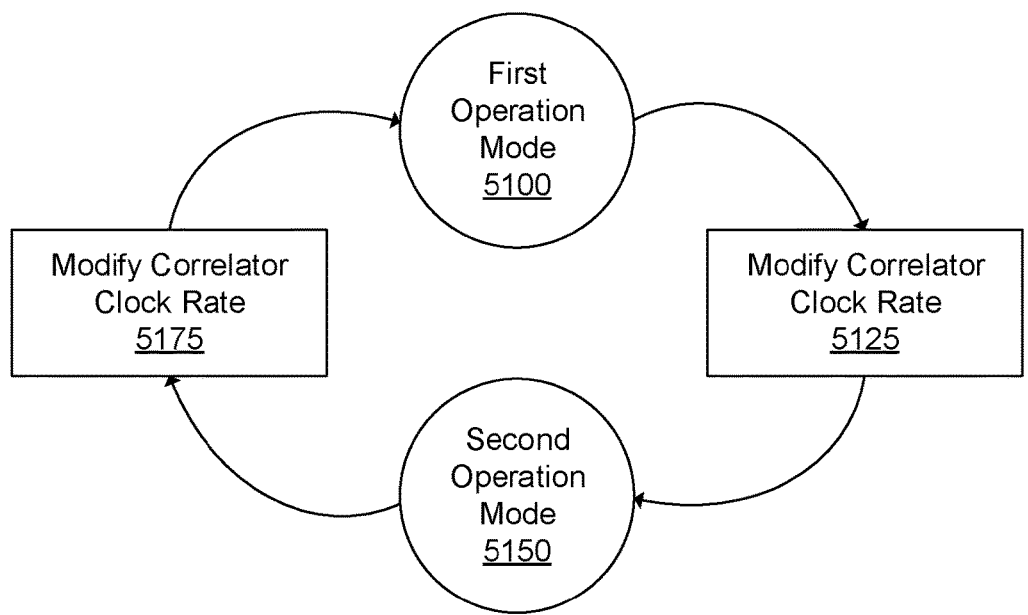
FIG. 5 shows an example state transition diagram for adjusting the clock rate of a correlator in a GNSS receiver based on the mode of operation of the receiver.

FIG. 5 illustrates a state transition diagram for a GNSS receiver for adjusting the clock rate of a correlator in a GNSS receiver based on the mode of operation of the receiver.

The GNSS receiver may be configured to operate in either a first operation mode or a second operation mode. In the first operation mode 5100, the GNSS receiver 100 may be configured so that the correlator 220 is clocked at a first clock rate. In the second operation mode 5150, the GNSS receiver 100 may be configured so that the correlator 220 is clocked at a second clock rate that is different to the first clock rate. In an example, the first operation mode may be an acquisition mode and the second operation mode may be a tracking mode. Where the first and second operations modes are acquisition and tracking modes, respectively, the first clock rate may be faster than the second clock rate. When the mode of operation of the receiver 100 is changed from a first operation mode 5100 to a second operation mode 5150, the receiver may be configured to modify the clock rate of the correlator 5125 from the first clock rate to the second clock rate. When the mode of operation of the receiver 100 is changed from a second operation mode 5150 to a first operation mode 5100, the receiver may be configured to modify the clock rate of the correlator 5175 from the second clock rate to the first clock rate.

As mentioned previously in connection with FIG. 3(a) the GNSS receiver 100 may comprise a control module 260 that manages memory allocation when the GNSS receiver is operating in the different modes. This control module 260 may also (or alternatively) be used to control the rate of the processor clock when operating in the different modes. For example, the GNSS receiver 100 may comprise a processor clock (not shown in FIG. 3(a)) which is controllable to operate at a plurality of different rates, such as a first rate and a second rate. The control module 260 may be communicatively coupled to the processor clock so that it can control the clock rate based on the current operating mode of the GNSS receiver.

In a second mode (e.g. a tracking mode), the GNSS receiver 100 runs operations over the generated correlation results in order to track candidate satellites. During the tracking mode operations, it may be that further correlation results need to be generated. For example, it is possible that the correlation results for a particular ranging code need to be produced again (or at a particular lag). It is therefore possible to configure the correlator 220 to perform the specific operations needed at a faster clock rate during tracking. For example, in the circumstance where correlations results for a single ranging code need to be generated, the correlator may be configured to operate only on different lags for that ranging code in parallel using the faster (first) clock rate, thereby producing the required result more quickly. In other words, whilst operating in the second mode (e.g. a tracking mode), the GNSS receiver 100 may detect an increased correlator workload and temporarily increase the clock rate of the processor clock to the first rate, so that the workload can be completed more quickly.

As described above with reference to FIG. 3(a), the GNSS receiver 100 may also comprise further peripheral processing units, such as vector processor 240. In some examples, these further peripheral processing units may also be clocked at the same rate as the correlator 220, such that they are also clocked at a faster rate during the first mode (e.g. acquisition) and at a slower rate during the second (e.g. tracking).

GNSS Signal Interference

Figure 6:
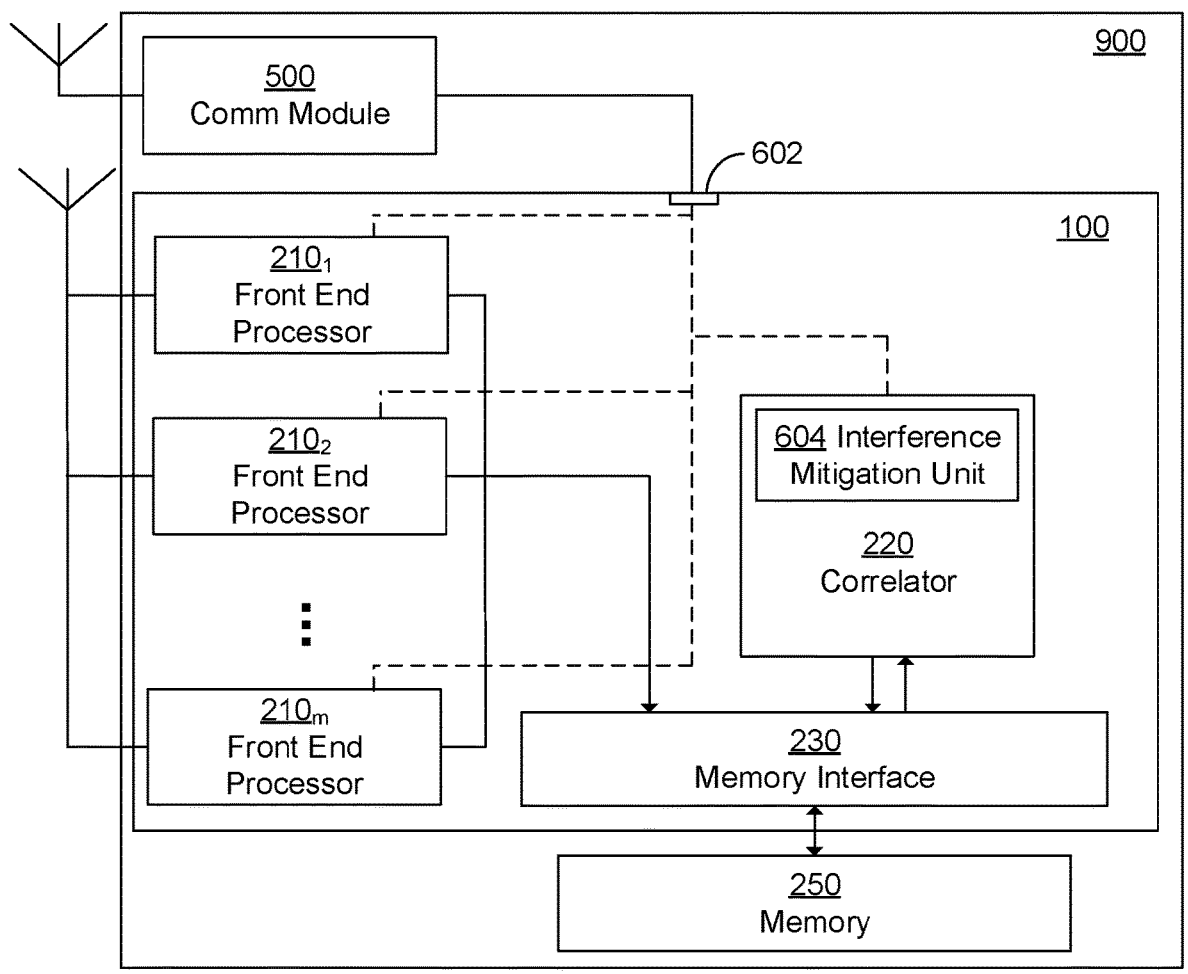
FIG. 6 shows a computer system in which a GNSS receiver according to the present disclosure is implemented.

The GNSS receivers described herein can be implemented within a computer system 900, as illustrated in FIG. 6. The computer system 900 may include other peripheral modules, some of which may be able to transmit and receive data wirelessly. For example, computer system 900 may comprise a communication module 500 that is configured to wirelessly transmit over a wireless channel that can interfere with the GNSS signal. Where the communication module 500 is located in the same computer system 900 as the GNSS receiver 100, the transmission of data by the communication module 500 may interfere with the GNSS signal being received by the GNSS receiver 100. Such interference may result in incorrect data samples of the GNSS signal being determined by GNSS receiver 100. Such incorrect data values may result in inaccurate location determination by the GNSS receiver 100.

It is therefore desirable to reduce the impact of interference generated by wireless transmission initiated by communication module 500 on the received GNSS signal. In known arrangements, a surface acoustic wave (SAW) filter may be implemented to reduce the effect of interference on the GNSS signal. However, this approach requires additional hardware to be implemented within the computer system 900 and thus may increase power or size requirements for the computing system.

The inventors have recognised that, in some examples, communication module 500 may wirelessly transmit data in a predictable, repeated manner. For example, the communication module 500 may transmit for a fixed period of time in a regular pattern—such as for the first 10 ms out of every 100 ms. The interference may therefore apply only to a portion of the input data values that are received by the GNSS receiver 100 and in a manner that means it is possible to determine which input data values might be affected by the interference.

Furthermore, since the communication module 500 and the GNSS receiver 100 are implemented in the same computer system 900, the inventors have also recognised that in some examples it is possible to synchronise the operation GNSS receiver 100 with the data transmission of the communication module 500. Specifically, it is possible for the GNSS receiver to determine regular times at which the communication module 500 will transmit. Where the transmissions from the communication module 500 are not predictable, a control signal indicating when the communication module 500 is transmitting can be used for synchronising the GNSS receiver 100 to the communication module 500. In particular, the architectures of the GNSS receivers described herein provide a flexibility that enables such synchronisation to decrease the impact of interference.

Since the architecture of the GNSS receiver allows a set of data samples to be captured and stored in memory and for batches of the set of data samples to be processed from memory, it is possible to compare the transmission times of the communication module with particular captured samples to identify samples that were received during transmission by the communication module. Where such samples are received, they can be considered to be candidates for experiencing interference. For example, a particular batch of data samples may be retrieved from memory for processing by a correlator 220 that does not at any point overlap in time with the transmission time of the communication module. In that circumstance, the particular batch of data samples does not experience interference and can thus be processed accordingly. Where, for a particular batch of data samples retrieved from memory for processing by a correlator 220, at least one sample was received during a transmission by communication module 500, that batch of data may be processed differently. For example, the receiver 100 may know in advance when the module 500 is to transmit and to schedule data capture to avoid interference, or the receiver may be configured to identify specific data samples that are affected and to disregard those affected samples from the correlation operation.

As shown in the example computer system of FIG. 6, computer system 900 comprises a communication module 500 and a GNSS receiver 100.

The communication module 500 is a wireless communication module communicatively coupled to the GNSS receiver 100 and configured to provide to the GNSS receiver 100 a control signal, which is received at an input 602 to the GNSS receiver 100. The control signal may be a synchronisation signal that comprises timing information that indicates one or more transmission times during which the communication module is to wirelessly transmit data. The control signal may comprise one or more indications of times which indicate times at which the module 500 will transmit. The control signal may be received at an interference mitigation unit 604.

In some examples, the interference mitigation unit 604 may be part of the correlator 220 (as illustrated in FIG. 6), and is configured detect and handle samples potentially affected by interference as part of the correlation operation. In other examples, the interference mitigation unit 604 may be separate from the correlator 220, e.g. it may be part of the control module 260 (not shown in FIG. 6) or an independent unit. In further examples, the interference mitigation unit 604 may be incorporated into the front end processors 210, particularly if the interference mitigation is based on rescheduling sampling to avoid transmissions by the wireless communication module 500. Alternative, any suitable combination of the above may be implemented.

Since the communication module 500 and the GNSS receiver 100 are part of the same computer system 900, the modules may utilise the same clock. Accordingly, the module 500 may be configured to indicate a future clock cycle or timestamp at which the module 500 will transmit. The indication may include individual times at which transmission occurs or the indication may include a start point and duration of the transmission. Alternatively, the module 500 may be configured to transmit a signal, the level of which may indicate the transmission status of the module 500. For example, where the signal is high at a given moment in time may indicate that the module 500 is currently transmitting and where the signal is low at a given moment in time, this may indicate that the module 500 is not currently transmitting. From the received control signal, it is possible to identify transmission times indicating one or time windows during which the module 500 was transmitting.

The GNSS receiver 100 is able to make use of these transmission times to identify which of the captured data samples of the GNSS signal received by the GNSS receiver were received whilst the communication module 500 was transmitting. One approach for identifying data samples received during a transmission is to compare the transmission times to sample times that represent times at which the received data samples were captured. Where there is an overlap or correspondence in time between the capture of a data sample and the transmission by module 500, the data sample can be identified as a candidate sample for interference. A candidate sample for interference is a sample that may be inaccurate due to the presence of interference and thus should be processed in a manner that reflects the possible inaccuracy.

Data samples that may suffer from interference may not to be relied upon. In some implementations, the candidate samples for interference may be corrected or disregarded prior to, or as part of, the correlation operations performed by correlator 220. The correlator 220 may therefore be configured to identify data samples from the stored data samples that were received during the data transmissions by the communication module 500 and to handle those samples differently from other received data samples.

Where data that is deemed to be a potential candidate for interference is to be processed by the correlator 220, the correlator may be configured to disregard data sample values. In this way, the correlation operation performed by correlator 220 would only operate on data samples within the portion of a batch (or within a batch) that are not identified as candidate samples for interference, and thus would not include that are deemed as candidates for interference. In the example of FIG. 4(*a*), an accumulator in the processing element 223 would thus not accumulate values from such samples. In some arrangements, an entire portion of a batch of data samples or an entire batch of data samples may be disregarded/skipped from processing by the correlator in the event that at least one of the samples in the portion or batch has been identified as a candidate sample for interference. It may be possible to disregard/skip a batch or portion of a batch of input data samples in the event that a proportion of the samples in the batch or portion is above a predetermined threshold, such as when greater than half of the samples are candidates for experiencing interference.

In some arrangements, correlator 220 may be configured to perform additional processing on a batch or portion of a batch of input data samples in which one or more data samples have been identified as candidate samples for interference, or where more than a predetermined proportion of the samples in a batch/portion have been so identified. The additional processing of the batch or portion of a batch of input data samples may take the form of interference correction processing that seeks to recover an un-interfered value of the data sample by removing the effect of the interference on the candidate sample for interference.

Figure 7A:
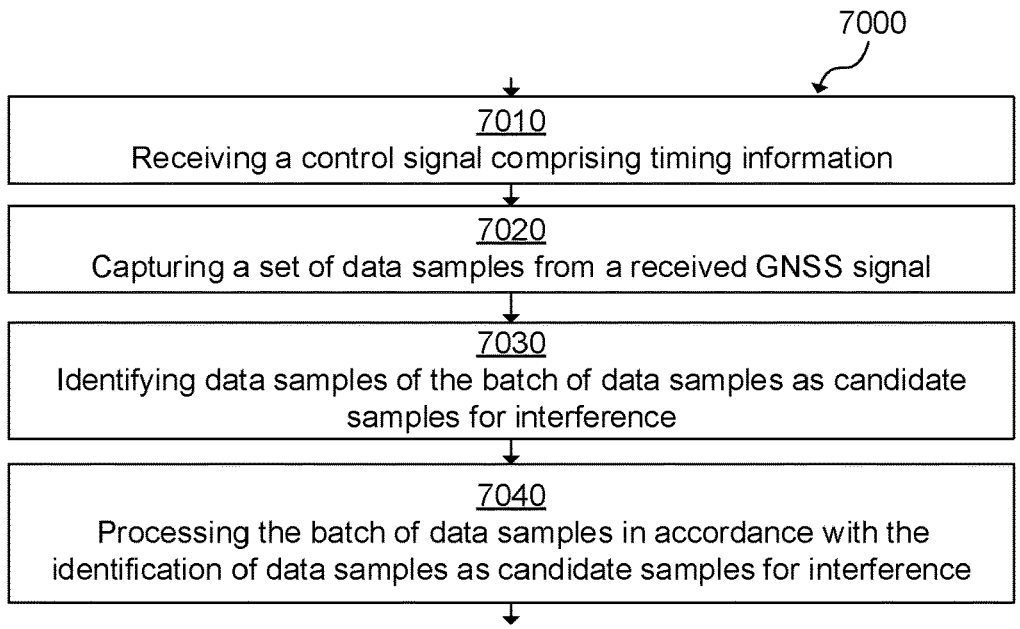
FIG. 7(a) shows a flow chart illustrating an example method for processing GNSS data samples to identifying data samples as candidate samples for interference.
Figure 7B:
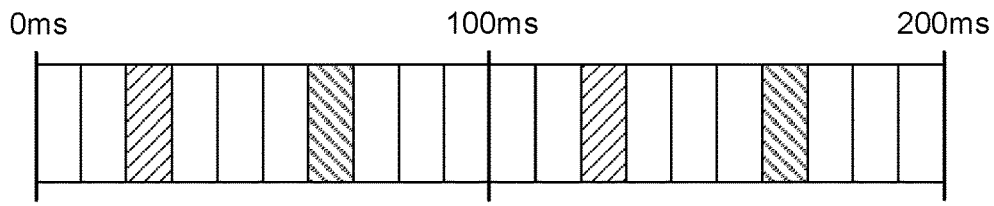
FIG. 7(b) shows an example of input data samples received at a GNSS receiver according to the example of FIG. 7(a)

FIG. 7(*a*) illustrates an example method 7000 for processing GNSS sample data that may be implemented in the computer system 900 of FIG. 6.

At step 7010 of FIG. 7(*a*), the GNSS receiver 100 is configured to receive a control signal that comprises timing information that indicates one or more transmission times during which the wireless communication module wirelessly transmits data.

At step 7020 of FIG. 7(*a*), a set of data samples are captured at the GNSS receiver from a received GNSS signal and stored in a memory, such as memory 250. Each sample is captured at a corresponding sample time. In some arrangements, the corresponding sample time may be stored to memory. Alternatively, a range of samples times reflecting the times at which the samples were captured may be stored to memory.

At step 7030 of FIG. 7(*a*), data samples of at least a portion of a batch of the captured set of data samples may be identified as candidate samples for interference based on a correspondence between the sample times at which data samples were captured and the transmissions times of the wireless communication module. This identification may comprise the comparison of transmission times with sample times, for example to determine a range of overlapping times to identify candidate samples for interference.

At step 7040 of FIG. 7(*a*), the at least a portion of the batch of data samples (or the entire batch) may be processed in accordance with the identification of data samples as candidate samples for interference. For example, one or more samples may be disregarded from processing by a correlator based upon the identified candidate samples for interference. In some arrangements, the processing may comprise performing interference correction on at least some data samples based on the identification of data samples as candidate samples for interference.

An example of input data samples received at the GNSS receiver 100 is illustrated in FIG. 7(*b*). In the example of FIG. 7(*b*), the communication module 500 is configured to transmit in two windows every 100 ms. In particular, the communication module 500 is configured to transmit between 20 ms and 30 ms and between 60 and 70 ms of every 100 ms period—these portions are shown with hashed lines in FIG. 7(*b*). Accordingly, data samples received during these windows by receiver 100 will likely suffer from interference should be either ignored, processed differently, or the GNSS receiver should control the front end processors to avoid sampling during these periods.

Vector Processor

As previously described, FIG. 3(a) illustrates an example of a GNSS receiver that comprises a vector processor 240. The vector processor 240 is configured to process the correlation results produced by the correlator 220 to make a determination as to receiver parameters that can be used in synchronising to one or more satellites. The vector processor may be a vector-wise peripheral that is communicatively coupled to memory interface 230. Vector processor 240 is configured to perform mathematical operations upon values arranged in arrays. In this way, the vector processor is configured to receive values stored in memory, perform mathematical operations upon them, and then return the results to memory to be stored in a separate portion of memory. For example, the vector processor may be configured to perform one or more operations, such as row and/or column summation and absolute values determined by $\sqrt{I^2+Q^2}$.

The vector processor 240 is configured to operate in a tracking mode upon the correlation results generated by correlator 220 to fine tune the receiver parameters based on the correlation results. The vector processor processes the correlation results in order to determine which receiver parameters the GNSS receiver should use when processing received GNSS signals.

In some examples, the receiver parameters may be the ranging code and an associated phase error (i.e. lag/delay) and/or frequency offset (i.e. Doppler shift or phase rate error). As mentioned previously, each correlation operation performed by the correlator is associated with a set of parameters, and these may be stored in association with the correlation result.

Since the correlation results are stored in memory 250 after being generated by the correlator, the vector processor 240 is configured to retrieve the correlation results from memory 250 (optionally via a memory interface 230) and process the results offline. For example, the vector processor 240 is able to operate upon the same correlation results over the course of a number of different passes of the vector processor 240. This allows the vector processor to run different hypotheses over the same correlation results in an attempt to more accurately identify receiver parameters that enable the receiver to lock to a particular satellite. The vector processor has flexibility in processing the correlations results, since the results are stored in memory and can be used multiple times.

In some arrangements, it may be that the vector processor is unable to identify with any particular degree of accuracy the receiver parameters to use—or that the GNSS receiver may lose a lock to a particular satellite based on a current set of receiver parameters. The GNSS receiver may therefore require new correlation results for that satellite (i.e. for that ranging code). Accordingly, the correlator is configured to generate new correlation results based on new samples of data obtained by the relevant front end processor in order to enhance the capability of the vector processor. In this circumstance, the GNSS receiver 100 may be configured to reinitiate the operation of the front end processors to obtain fresh data samples and to store those fresh data samples in memory 250. The front end processors can then be disabled and the correlator 220 may be re-enabled. Correlator 220 receives data samples from the newly received data and processes the results in order to create new correlation results. The new correlation results are added to the previous correlations and the vector processor 240 can run a new hypothesis (or hypotheses) over the results to better fine tune the receiver parameters. The output of the vector processor is a set of receiver parameters that identify GNSS satellites to which the receiver is able to lock. These parameters may also be stored in memory 250 for use in operating the GNSS receiver. Once locked to a set of satellites, the correlator may be configured to process only data associated with the ranging codes of the locked satellites.

It will be appreciated that the vector processor and the correlator are able to share memory which removes the requirements for the two elements to have dedicated memories.

Candidate Selection

The vector processors 240 described in the present disclosure are configured to process correlation results in order to identify one or more high correlation results, and hence select one or more associated receiver parameters. To do this, the vector processor 240 is configured to receive a plurality of correlation results stored in memory 250 that were generated by correlator 220.

Figure 8:
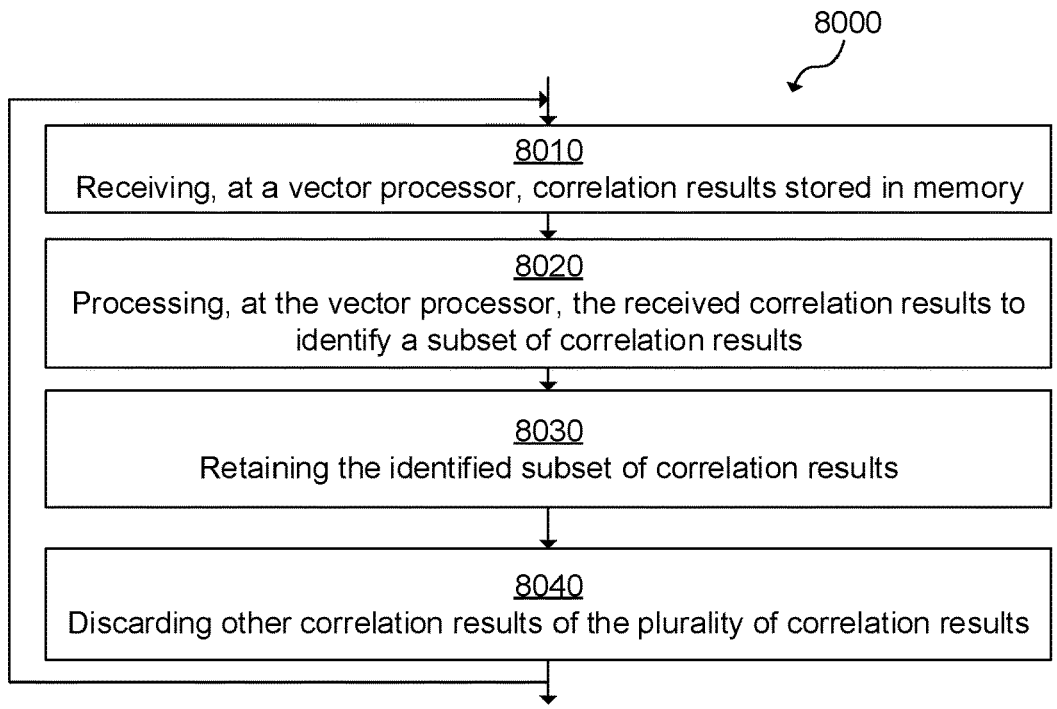
FIG. 8 shows a flow chart illustrating an example method for processing correlation results at a vector processor according to the present disclosure.

FIG. 8 illustrates an example method 8000 for selecting candidate receiver parameters for locking on to a satellite signal. Since each correlation result generated by the correlator is associated with a combination of receiver parameters, it is possible to discard combinations of receiver parameters based upon the values of the corresponding correlation results. Where the correlation result indicates a low correlation, such results can be discarded and not retained. By discarding correlation results (and thus possible combinations of receiver parameters), memory is freed for use by other resources. This is particularly relevant for the GNSS receivers 100 described herein since the memory resource may be single resource shared between multiple peripheral modules in the GNSS receiver.

At step 8010, a first set of correlation results is retrieved from memory (such as memory 250) and passed to the vector processor 240. The first set of correlation results may be generated by a correlator 220, for example using method 4000. The correlation results may each be associated with a respective combination of receiver parameters. As described previously, a particular correlation operation may be generated for a particular combination of ranging code and lag (code delay) and are thus associated with these receiver parameters. If a particular combination of receiver parameters is deemed to have a high correlation, then that combination of receiver parameters may be used in receiving data from a particular satellite. The vector processor may therefore operate on an array of correlation results, each correlation result corresponding with a specific combination of receiver parameters.

At step 8020, the received first set of correlation results are processed to identify a first subset of correlation results. The processing involves determining which of the received first correlation results have the highest correlation. In this way, only some of the received first correlation results are identified and the remaining correlation results are not identified in the first subset. The identification of correlation results as part of the first subset may be performed in one of a number of different ways.

For example, the first subset of correlation results may be identified by a predetermined threshold value at which a correlation result is a possible candidate combination of receiver parameters for use in locking to a satellite signal. Accordingly, processing the first set of correlation results may comprise comparing each correlation result to the predetermined threshold value and identifying results which meet the threshold value (i.e. they are less than or equal to the threshold) and thus indicate a possible candidate combination of receiver parameters. Correlation results which meet the threshold are therefore included in the first subset of correlation results and those which do not meet the threshold are not included in the first subset of correlation results.

In an alternative or additional approach, the vector processor may be configured to identify a predetermined number of correlation results having the highest correlation. For example, it may be possible to identify 50 correlation results that have the highest correlation. This may be done by ordering the correlation results by their value and selecting the first 50 (or other predetermined number). This may be combined with the previously described approach to provide two levels of selected values, i.e. either the top 50 correlation values or above a predetermined threshold, to ensure that a suitable number of correlation results are retained.

It will be appreciated that further processing of the correlation results may be performed in addition or instead of the processing identified above and the approaches described above are illustrative examples only.

At step 8030, the method 8000 further comprises retaining the identified first subset of correlation results. Retaining the first subset of correlation results may comprise re-writing the selected subset of first correlation results to a different portion of memory (such as memory 250). Alternatively, retaining the first subset of correlation results may comprise retaining the first subset of correlation results at the location in memory (such as memory 250) at which the correlation results were read. As such, it may be possible to retain the first subset of correlation results without performing any active operation on memory. Since the values are already stored in memory, it may be possible to retain the values simply by not operating on those values.

At step 8040, the method further comprises discarding other correlation results of the first set of correlation results. Discarding the other correlation results may comprise marking or flagging the correlation results in memory (such as memory 250) from which the values were read as deleted. For example, a header associated with that portion of memory may be modified to indicate that the portion of memory at which those values were stored are available for use and thus other values can be stored at these memory locations. Alternatively, discarding the other correlation results may not require any active operation on memory. For example, where the first subset of correlation results is stored to further portion of memory, discarding the other correlation results may involve not storing the other correlation results in the further portion of memory. Accordingly, by storing the first subset of correlation results to a further portion of memory and marking the original portion of memory from which the first set of correlation results were read as deleted and free for use, the other correlation results not identified in the first subset are discarded (since they are no longer stored in the original portion of memory and are not stored in the further portion).

Steps 8010 to 8040 may be repeated for further sets of correlation results to update possible candidate combinations of receiver parameters. For example, once step 8040 has been completed in a first pass of the method, the method may return to step 8010. At step 8010, a second set of correlation results, different to the first of correlation results, may be retrieved from memory (e.g. memory 250). In addition, the first subset of correlation results may be retrieved from memory (or may be retained in the vector processor from the previous processing). The method may then proceed to step 8020 at which both the first subset of correlation results and the second set of correlation results may be processed in a similar manner as described above in relation to step 8020 to generate a second subset of correlation results. The second subset of correlation results may be subset of the correlation results selected from the first subset of correlation results and the second set of correlation results. Put another way, the second subset of correlation results may comprise one or more correlations results of the first subset of correlation results and/or one or more correlation results of the second set of correlation results. The second subset of correlation results may be identified in a corresponding manner to that described above, by identifying one or more correlation results having a value equal to or greater than a predetermined threshold value or by identifying a predetermined number of correlation results based on their value.

Steps 8030 and 8040 may be performed in a corresponding manner to that described above, by retaining the second subset of correlation results and discarding other correlation results. In more detail, the second subset of correlation results may be retained in memory by storing the second subset of correlation results to a further portion of memory (e.g. memory 250) or by simply retaining the originally stored values, which may be split across the first subset of correlation results and the second set of correlation results. Further, discarding other correlation results may include not storing these correlation results to the further portion of memory when storing the second subset of correlation results to the further portion of memory. Alternatively, the memory locations at which the other correlation results are stored may be marked as free for further use. The other correlation results may be the correlation results of the second set of correlation results and the first subset of correlation results which were not identified for the second subset of correlation results.

The process described above may be repeated for any number of iterations, with each iteration passing a further set of correlation results to the vector processor for processing and the vector processing the further set of correlation results and the previously identified subset of correlation results to identify a further subset of correlation results which represent the most recently identified likely candidate combinations of receiver parameters for locking to a particular satellite signal in a GNSS signal.

By retaining identified subsets of correlation results in this way and discarding other correlation results, it is possible to reduce the memory resources required to store correlation results during the processing of a GNSS signal. Specifically, it is possible to discard receiver parameter combinations that do not likely represent combinations of receiver parameters that can be used to receive a satellite signal from a GNSS signal. This method allows only strong candidates to be retained and stored in a shared memory which means that a greater proportion of the memory can be allocated to other functions.

In the GNSS receivers described herein, sample data is processed in batches or portions of batches in a correlator to serially produce correlation results based on the bandwidth of the correlator in doing so. In some arrangements, correlation results may be batched at an output buffer in the correlation for storage back to memory in batches. Accordingly, not all of the correlation results may be made available for processing at the same time. In addition, due to the batching of correlation results in the output buffer, the results may only be made available in batches.

The presently described vector processor and method operates synergistically with the operation of the previously described correlator since the vector processor is configured to operate on batches of correlation results and can iteratively refine the candidate correlation results based on further received batches of correlation results. By operating in this way, a final determination as to the combinations of receiver parameters to use in receiving satellite signals can be made more quickly than performing an operation over all of the correlation results. This is because the vector processor does not need to wait for all correlation results to be made available. Instead, processing of correlation results by the vector processor can be initiated as soon as a first batch of correlation results is generated. Latency in processing correlation results is therefore reduced.

Figure 9:
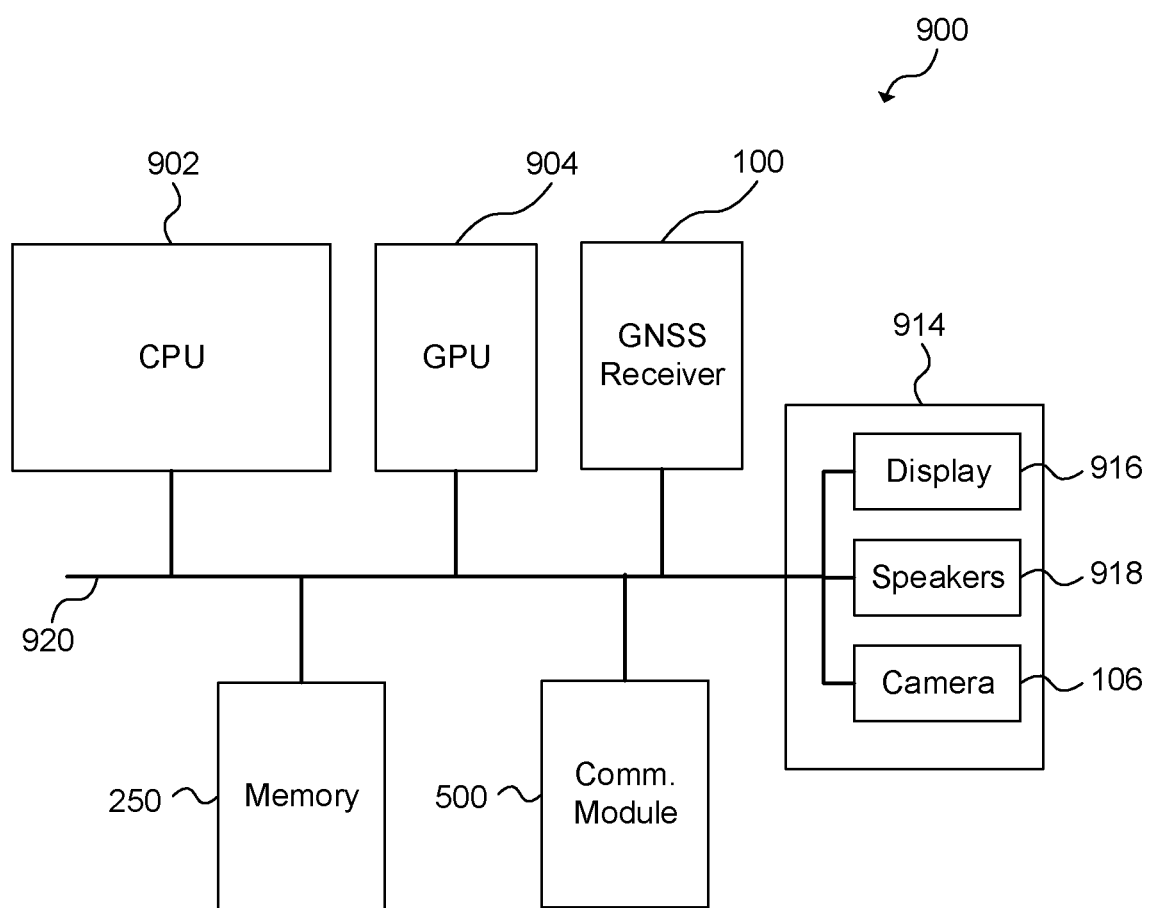
FIG. 9 shows a computer system in which a GNSS receiver according to the present disclosure.

FIG. 9 shows a computer system in which the GNSS receiver described herein may be implemented. The computer system may comprise one or more of a CPU 902, a GPU 904, a GNSS receiver 100, a communication module 500, memory 250 and other devices 914, such as a display 916, speakers 918 and a camera 106. The components of the computer system can communicate with each other via a communications bus 920.

The GNSS receivers of FIGS. 2-9 are shown as comprising a number of functional blocks. This is schematic only and is not intended to define a strict division between different logic elements of such entities. Each functional block may be provided in any suitable manner. It is to be understood that intermediate values described herein as being formed by a GNSS receiver need not be physically generated by the GNSS receiver at any point and may merely represent logical values which conveniently describe the processing performed by the GNSS receiver between its input and output.

The GNSS receivers described herein may be embodied in hardware on an integrated circuit. The GNSS receivers described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a GNSS receiver configured to perform any of the methods described herein, or to manufacture a GNSS receiver comprising any apparatus described herein. An integrated circuit definition dataset may be, for example, an integrated circuit description.

Therefore, there may be provided a method of manufacturing, at an integrated circuit manufacturing system, a GNSS receiver as described herein. Furthermore, there may be provided an integrated circuit definition dataset that, when processed in an integrated circuit manufacturing system, causes the method of manufacturing a GNSS receiver to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a GNSS receiver will now be described with respect to FIG. 10.

Figure 10:
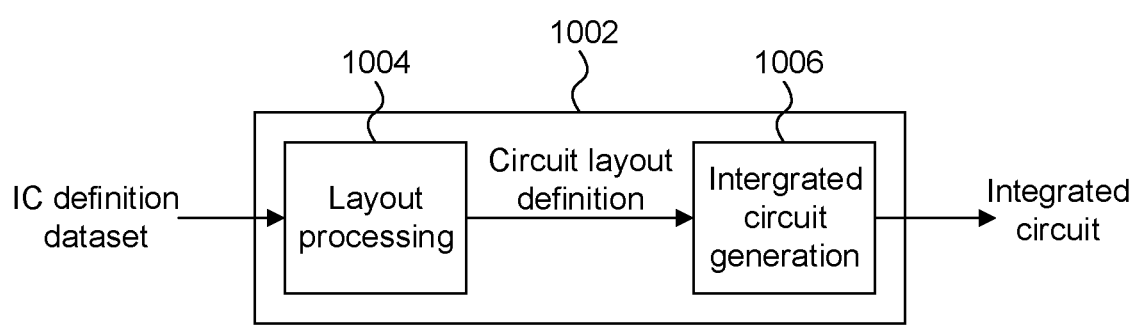
FIG. 10 shows an integrated circuit manufacturing system for generating an integrated circuit embodying a GNSS receiver.

FIG. 10 shows an example of an integrated circuit (IC) manufacturing system 1002 which is configured to manufacture a GNSS receiver as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a GNSS receiver as described in any of the examples herein), process the IC definition dataset, and generate an IC according to the IC definition dataset (e.g. which embodies a GNSS receiver as described in any of the examples herein). The processing of the IC definition dataset configures the IC manufacturing system 1002 to manufacture an integrated circuit embodying a GNSS receiver as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a GNSS receiver without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 10 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 10, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A Global Navigation Satellite System (GNSS) correlator comprising:
    a buffer configured to store input data representing sample values of a GNSS signal captured over a pre-defined time window; and
    a processing unit configured to receive one or more correlation parameters in a control signal, and, in a first pass, read the input data from the buffer and perform a first correlation operation on the input data, and, in a second pass, re-read the same input data from the buffer and perform a second correlation operation on the same input data, wherein the second correlation operation is different to the first correlation operation.

2. The GNSS correlator according to claim 1, wherein the correlation parameters define a plurality of ranging codes and a plurality of lags to apply to each ranging code, and wherein each correlation operation comprises correlating at least one selected ranging code having at least one selected lag with the input data.

3. The GNSS correlator according to claim 2, wherein the correlation parameters further define a ranging code and lag combination to be applied in each pass.

4. The GNSS correlator according to claim 3, wherein:
    the ranging code is kept the same over the first and second pass, and the lag is varied between the first and second pass; or
    the lag is kept the same over the first and second pass, and the ranging code is varied between the first and second pass; or
    both the lag and the ranging code is varied between the first and second pass.

5. The GNSS correlator according to claim 2, wherein the processing unit is configured to generate a plurality of correlation results in each correlation operation.

6. The GNSS correlator according to claim 5, wherein the processing unit is configured to generate sixteen correlation results based on the correlation of one ranging code with sixteen different lags against the input data.

7. The GNSS correlator according to claim 5, wherein the processing unit is configured to generate sixteen correlation results based on the correlation of two different ranging codes with eight different lags against the input data.

8. The GNSS correlator according to claim 2, further comprising at least one further processing unit, wherein the processing unit and the at least one further processing unit are configured to perform correlation operations in parallel in each pass.

9. The GNSS correlator according to claim 8, wherein the correlation parameters define a ranging code and lag combination to be applied in each processing unit in each pass.

10. The GNSS correlator according to claim 1, wherein the second correlation operation is performed subsequent to the first correlation operation.

11. The GNSS correlator according to claim 1, wherein the correlator further comprises an output buffer, and wherein the processing unit is configured to store correlation results from each pass in the output buffer, and wherein the output buffer is configured to subsequently write the correlation results to an external memory.

12. The GNSS correlator according to claim 11, wherein the correlator further comprises a context unit configured to store context data identifying at least a portion of the correlation parameters and further configured to write the context data to an external memory in association with the correlation results.

13. The GNSS correlator according to claim 1, wherein the correlator further comprises a batch memory that holds a larger amount of data than the buffer and is configured to retrieve and store a batch of data samples from an external memory, wherein the batch of data samples comprises the input data, and wherein the buffer is configured to retrieve the input data from the batch memory.

14. The GNSS correlator according to claim 13, wherein the batch memory is configured to store sample values of the GNSS signal captured over a plurality of the pre-defined time windows, and the buffer is configured to retrieve further input data from the batch memory once correlation operations on the input data are complete.

15. The GNSS correlator according to claim 2, wherein the correlator further comprises a ranging code memory configured to store each of the ranging codes and provide a selected ranging code to the processing unit based on the correlation parameters.

16. The GNSS correlator according to claim 2, wherein the correlator further comprises a ranging code generation unit configured to generate a selected ranging code based on the correlation parameters and provide the selected ranging code to the processing unit.

17. A method in a Global Navigation Satellite System (GNSS) correlator, the GNSS correlator for performing correlation operations on samples of a GNSS signal, the method comprising:

storing, in a buffer, input data representing sample values of the GNSS signal captured over a pre-defined time window;

receiving, at a processing unit, one or more correlation parameters in a control signal;

in a first pass at the processing unit, reading the input data from the buffer and performing a first correlation operation on the input data in dependence on the correlation parameters; and in a second pass at the processing unit, re-reading the same input data from the buffer and performing a second correlation operation on the same input data in dependence on the correlation parameters, wherein the second correlation operation is different to the first correlation operation.

18. The method according to claim 17, wherein the correlation parameters define a plurality of ranging codes and a plurality of lags to apply to each ranging code, and wherein each correlation operation comprises correlating at least one selected ranging code having at least one selected lag with the input data.

19. The method according to claim 18, wherein the correlation parameters further define a ranging code and lag combination to be applied in each pass, and wherein:

the ranging code is kept the same over the first and second pass, and the lag is varied between the first and second pass; or the lag is kept the same over the first and second pass, and the ranging code is varied between the first and second pass; or both the lag and the ranging code is varied between the first and second pass.

20. A non-transitory computer readable storage medium having stored thereon a non-transitory computer readable dataset description of an integrated circuit that, when processed in an integrated circuit manufacturing system, causes the integrated circuit manufacturing system to manufacture a Global Navigation Satellite System (GNSS) correlator embodied in an integrated circuit and comprising:

a buffer configured to store input data representing sample values of a GNSS signal captured over a pre-defined time window; and a processing unit configured to receive one or more correlation parameters in a control signal, and, in a first pass, read the input data from the buffer and perform a first correlation operation on the input data, and, in a second pass, re-read the same input data from the buffer and perform a second correlation operation on the same input data, wherein the second correlation operation is different to the first correlation operation.

* * * * *